United States Patent [19]

Shibata et al.

[11] Patent Number: 5,572,977
[45] Date of Patent: Nov. 12, 1996

[54] FUEL INJECTION CONTROL SYSTEM FOR AN INTERNAL COMBUSTION ENGINE

[75] Inventors: Hiroshi Shibata, Kariya; Yoichi Nishiyori, Anjo; Kenichi Maki, Ichinoiya; Hiroshi Kondo, Anjo, all of Japan

[73] Assignee: Nippondenso Co., Ltd., Kariya, Japan

[21] Appl. No.: 293,460

[22] Filed: Aug. 22, 1994

[30] Foreign Application Priority Data

Aug. 23, 1993 [JP] Japan ..................... 5-207754

[51] Int. Cl.$^6$ .............................. F02D 41/10; F02D 41/26
[52] U.S. Cl. ....................... 123/480; 123/492; 364/431.05
[58] Field of Search ..................................... 123/480, 487, 123/492, 325, 326; 364/431.05

[56] References Cited

U.S. PATENT DOCUMENTS

| 4,245,605 | 1/1981 | Rice et al. ............................... 123/480 |
| 4,502,448 | 3/1985 | Otobe ...................................... 123/480 |
| 4,862,369 | 8/1989 | Yakuwa et al. .......................... 123/487 |
| 4,942,522 | 7/1990 | Wilkie et al. ........................... 364/200 |

FOREIGN PATENT DOCUMENTS

| 2-136543 | 5/1990 | Japan . |
| 2-176143 | 7/1990 | Japan . |
| 2244162 | 11/1991 | United Kingdom . |

Primary Examiner—Andrew M. Dolinar

[57] ABSTRACT

A fuel injection control system having an intelligent timer (TPU) to perform fuel injection control using the TPU even on request of asynchronous injection which is not synchronous with rotational angle signals. A central processing unit (CPU) calculates a value to be used during the execution of a synchronous injection (e.g., a fuel injection time) and an asynchronous injection time and stores these values in a parameter RAM. The CPU determines whether there is a request for an asynchronous injection from, for example, the quantity of a change in the opening of a throttle. The TPU also executes a synchronous injection if there is no asynchronous injection request. If there is an asynchronous injection request, it transmits an on output from input/output pins and causes a compare register to store a value which is the sum of the current time and an asynchronous injection time. It transmits an off output from the input/output pins if this value agrees with a value in a first free run counter.

9 Claims, 17 Drawing Sheets

FIG. I

FUEL INJECTION CONTROL SYSTEM FOR AN INTERNAL COMBUSTION ENGINE

BACKGROUND OF THE INVENTION

1. Field of the Invention

The present invention relates to a fuel injection control system for an internal combustion engine having an intelligent timer.

2. Description of the Related Art

Control systems using a microcomputer for controlling an internal combustion engine are known. In order to reduce the computational load to or number of processing steps of performed by a CPU (central processing unit) in a microcomputer, some recent control systems are equipped with an intelligent timer (hereinafter referred to as TPU) in addition to the CPU to control the engine. The TPU is a timer having control functions, such as outputting a desired signal when a predetermined point in time is reached. Specifically, with only the timing for starting a fuel injection, a fuel injection time, and the like obtained by a calculation performed by the CPU set in a parameter RAM in the TPU, the TPU independently performs subsequent injection executing processes, such as driving injectors for injecting fuel for a predetermined time at predetermined angular displacement or position without requiring processing by the CPU.

In such conventional systems, however, the TPU can perform only processes which are in synchronism with rotational angle signals such as a process of starting injections based upon rotational angle signals at predetermined intervals. Therefore, the TPU has not been practical because it has been unable to perform asynchronous injections, wherein fuel is injected at times which are not in synchronism with rotational angle signals.

Although asynchronous injections can be performed by way of control of the output of the TPU performed by the CPU, asynchronous injection times must be controlled by the CPU in such a case. As a result, additional calculation processes are required for the CPU to control asynchronous injections, notwithstanding the fact that the TPU is provided to reduce the calculation processes of the CPU. Further, a timer for asynchronous injections must be separately prepared, which complicates the system configuration.

SUMMARY OF THE INVENTION

It is an object of the present invention to provide a fuel injection control system which obviates the above drawbacks.

It is a further object of the present invention to provide a fuel injection control system for an engine capable of performing fuel injection control in response to requests for injections asynchronous with rotational angle signals, such as asynchronous injections, without increasing the processings of steps a CPU other than injection data calculations.

According to the present invention, which is shown in FIG. 19, for example, a fuel injection control system is equipped with a rotational angle detecting means for outputting a rotational angle signal at each predetermined rotational angle in response to the rotation of an internal combustion engine, a calculation device for calculating the injection time of a synchronous injection performed in synchronism with the rotational angle signal and the angular displacement at which the injection is started, an asynchronism determining means for determining whether there is an injection request for an asynchronous injection to be performed in asynchronism with the rotational angle signal, an asynchronous injection time calculating means for calculating the injection time of the asynchronous injection, an injection executing means having a storage means for storing a predetermined value, a counter which counts at predetermined time intervals, a first setting means for setting a predetermined value which is determined by the value of at least either the injection time of the synchronous injection or the angular displacement at which the injection is started in the storage means as requested, a second setting means for setting a predetermined value determined by at least the injection time of the asynchronous injection in the storage means as requested, an output means for outputting a signal at a predetermined level when the value stored in the storage means agrees with the value in the counter or when it is determined by the asynchronism determining means that there is an injection request for an asynchronous injection, and a level setting means for setting the level of the signal output by the output means.

The calculation device calculates the injection time of the synchronous injection performed in synchronism with the rotational angle signal detected by the rotational angle detecting means and the angular displacement at which the injection is started.

The asynchronism determining means determines whether an injection request for the asynchronous injection to be performed in asynchronism with the rotational angle signal is present, and the asynchronous injection time calculating means calculates the injection time of the asynchronous injection.

The storage means stores the predetermined value, and the counter counts at predetermined time intervals.

The first setting means sets the predetermined value, which is determined by at least any one of the injection time of the synchronous injection obtained by the calculation device, the injection delay time, or the angular displacement at which the injection is started in the storage means as requested.

When the synchronous injection is performed, the first setting means sets the angular displacement at which the injection is started in the storage means and, if the value set in the storage means agrees with the value of the rotational angle, sets a value which is the sum of the value in the counter at this point in time and the injection delay time between the angular displacement at which the synchronous injection is started and the transmission of an output for actually performing the fuel injection in the storage means. When the value in the storage-means agrees with the value in the counter, the output means outputs a signal at a predetermined level. The signal output this time has been set by the level setting means to a level at which the fuel injection is performed.

At this time, the first setting means newly stores in the storage means a value which is the sum of the counter value and the injection time of the synchronous injection. Next, if this value agrees with the counter value, the output means outputs a signal at a predetermined level again. The level of the signal output this time has been set by the level setting means to a level at which the fuel injection is not performed. Then, the first setting means sets the angular displacement at which the injection is started in the storage means again.

Next, when it is determined by the asynchronism determining means that there is a request for the asynchronous injection, the output means outputs a signal at a predetermined level. The level of the signal output this time has been set by the level setting means to the level at which the fuel injection is performed. At this time, the second setting means sets in the storage means a value which is the sum of the current counter value and the injection time of the asynchronous injection. If this value in the storage means agrees with the counter value, the output means outputs a signal at a predetermined level again. The level of the signal output this time has been set by the level setting means to the level at which the fuel injection is not performed. Next, the first setting means stores the angular displacement at which a fuel injection is started in the storage means.

DETAILED DESCRIPTION OF THE PRESENTLY PREFERRED EMBODIMENTS

The present invention will now be described in detail with reference to a presently preferred embodiment shown in the accompanying drawings.

Figure 1:
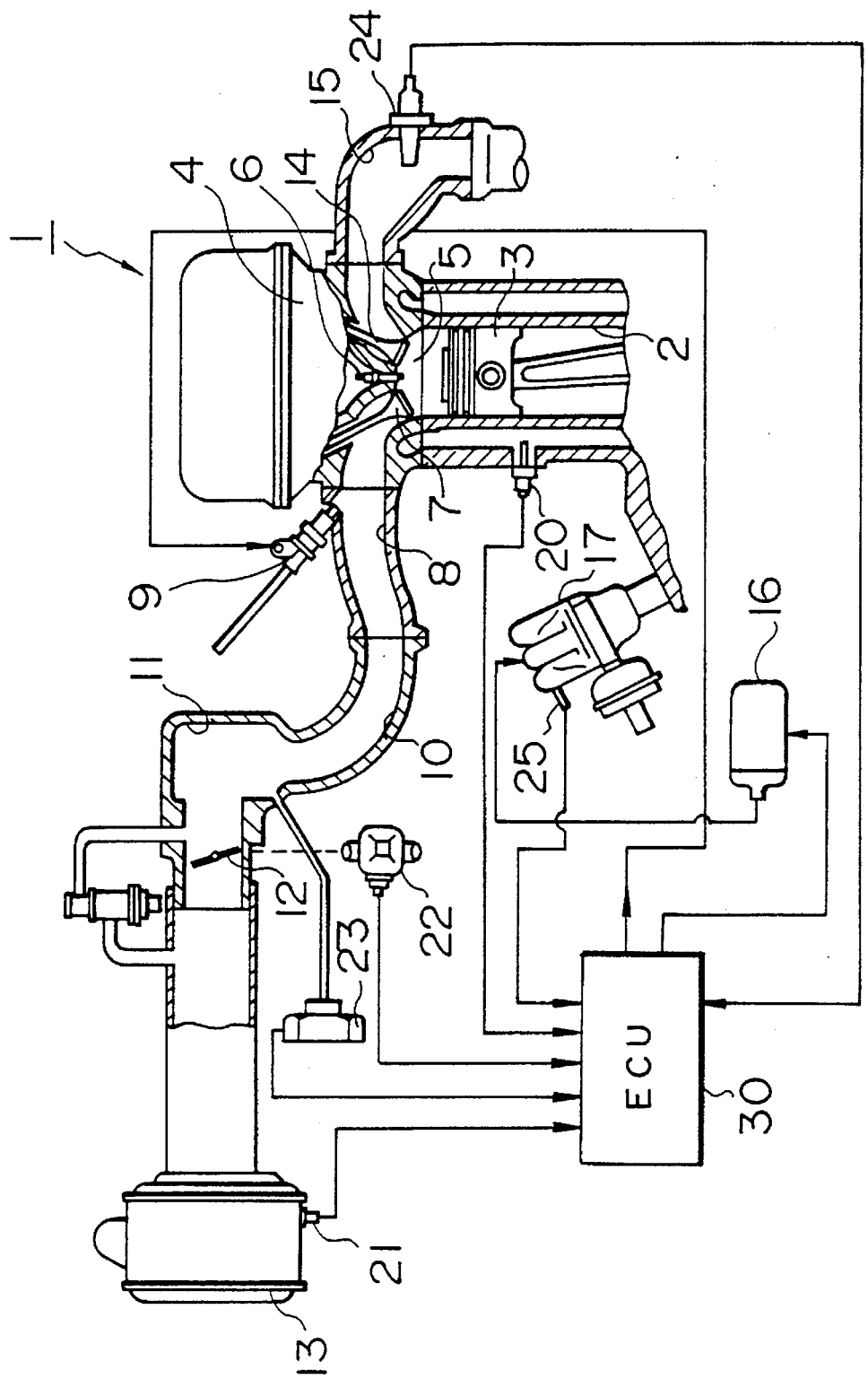
FIG. 1 is a schematic view showing the configuration of an internal combustion engine embodying the present invention.

A fuel injection control system for an internal combustion engine has a system configuration shown in FIG. 1. FIG. 1 illustrates a multi-cylinder internal combustion engine 1 wherein each combustion chamber 5 is comprised of a cylinder 2, piston 3, and a cylinder head 4. An ignition plug is disposed in the combustion chamber 5.

An intake system of the engine 1 comprises an intake manifold 8 in communication with the combustion chamber 5 through an intake valve 7, an injector 9 for injecting fuel into the intake manifold 8, an intake pipe 10 in communication with the intake manifold 8, a surge tank 11 for suppressing pulsations of intake air, a throttle valve 12, and an air cleaner 13. An exhaust system of the engine 1 has an exhaust manifold 15 in communication with the above-described combustion chamber 5 through an exhaust valve 14.

The engine 1 further includes an igniter 16 for outputting a high voltage required for ignition and a distributor 17 which is operatively associated with a crankshaft (not shown) of the engine 1 for distributing the high voltage generated by the igniter 16 to the ignition plug 6 in each cylinder.

Further, as detectors for the engine 1, there are provided a water temperature sensor 20 provided in a cooling system of the engine 1 for detecting the temperature of cooling water, an intake air temperature sensor 21 provided in the air cleaner 13 for detecting the temperature of intake air fed to the engine 1, a throttle position sensor 22 which is operatively associated with the throttle valve 12 for detecting the opening of the throttle valve 12, an intake pipe internal pressure sensor 23 in communication with the intake pipe 10 for measuring the internal pressure of the intake pipe, an oxygen concentration sensor 24 provided on the exhaust manifold 15 for detecting the concentration of residual oxygen in exhaust gas as an analog signal, and a rotational angle sensor 25 mounted in the distributor 17 for outputting a rotational angle signal each time a cam shaft of the distributor 17 makes a ¹⁄₂₄ rotation, i.e., at every angular rotation of 30° CA (crankshaft angle).

Signals detected by the above-described sensors are input to an electronic control unit (hereinafter simply referred to as ECU) 30 which controls the engine 1 by driving the fuel injection valve 9 and igniter 16, which have already been described, in accordance with such signals.

The configuration of the ECU 30 will now be described with reference to FIG. 2. The ECU 30 is configured as a logic circuit comprised mainly of a CPU 30a which inputs and calculates a signal detected by each of the above-described sensors according to a control program and performs calculation processes for controlling the above-described devices, a ROM 30b in which the control program and initial data are stored in advance, a RAM 30c in which various signals input to the ECU 30 and data required for controlling calculations are temporarily stored, a backup RAM 30d, which is backed up by a battery to be able to maintain the memory of various data required for controlling the engine 1 even when a key-switch of the engine 1 is tuned off by an operator, and a TPU 40 connected through a common bus 30e to an input/output port 30f, an input port 30g and an output port 30h for input from and output to external devices.

The ECU 30 has buffers 30i, 30j, 30k and 30m for receiving the output signals from the above-described intake pipe internal pressure sensor 23, water temperature sensor 20, intake air temperature sensor 21, throttle position sensor 22. It is further equipped with a multiplexer 30n for selectively outputting the output signals from those sensors to the CPU 30a and an A/D converter 30p for converting analog signals into digital signals. These signals are input to the CPU 30a through the input/output port 30f.

The ECU 30 further includes a buffer 30q for receiving the output signal of the oxygen concentration sensor 24, which has already been described, and a comparator 30r, which outputs a signal when the output voltage of the buffer 30q is equal to or higher than a predetermined voltage, the signal from the oxygen concentration sensor 24 being input to the CPU 30a through the input port 30g.

The ECU 30 further includes a waveform shaping circuit 30s for shaping the waveform of the output signal of the rotational angle sensor 25, a rotational angle signal from the rotational angle sensor 25 being input to the TPU 40 and to the CPU 30a through the common bus 30e.

The ECU 30 further includes driving circuits 30t and 30u for supplying driving currents to the warning lamp 26 and igniter 16 which have already been described. The CPU 30a outputs control signals to both of the driving circuits 30t and 30u through the output port 30h.

Controlled variables such as fuel injection times or periods and injection starting timing obtained by the CPU 30a through calculations based on information from the above-described various sensors are set in the TPU 40, which in turn outputs a control signal to a driving circuit 30w at timing in accordance with the controlled variables to control the injector 9.

The ECU 30 is further equipped with a clock circuit 30v for transmitting clock signals to the CPU 30a, TPU 40, ROM 30b, RAM 30c and the like which serve as control timing at predetermined intervals.

Figure 2:
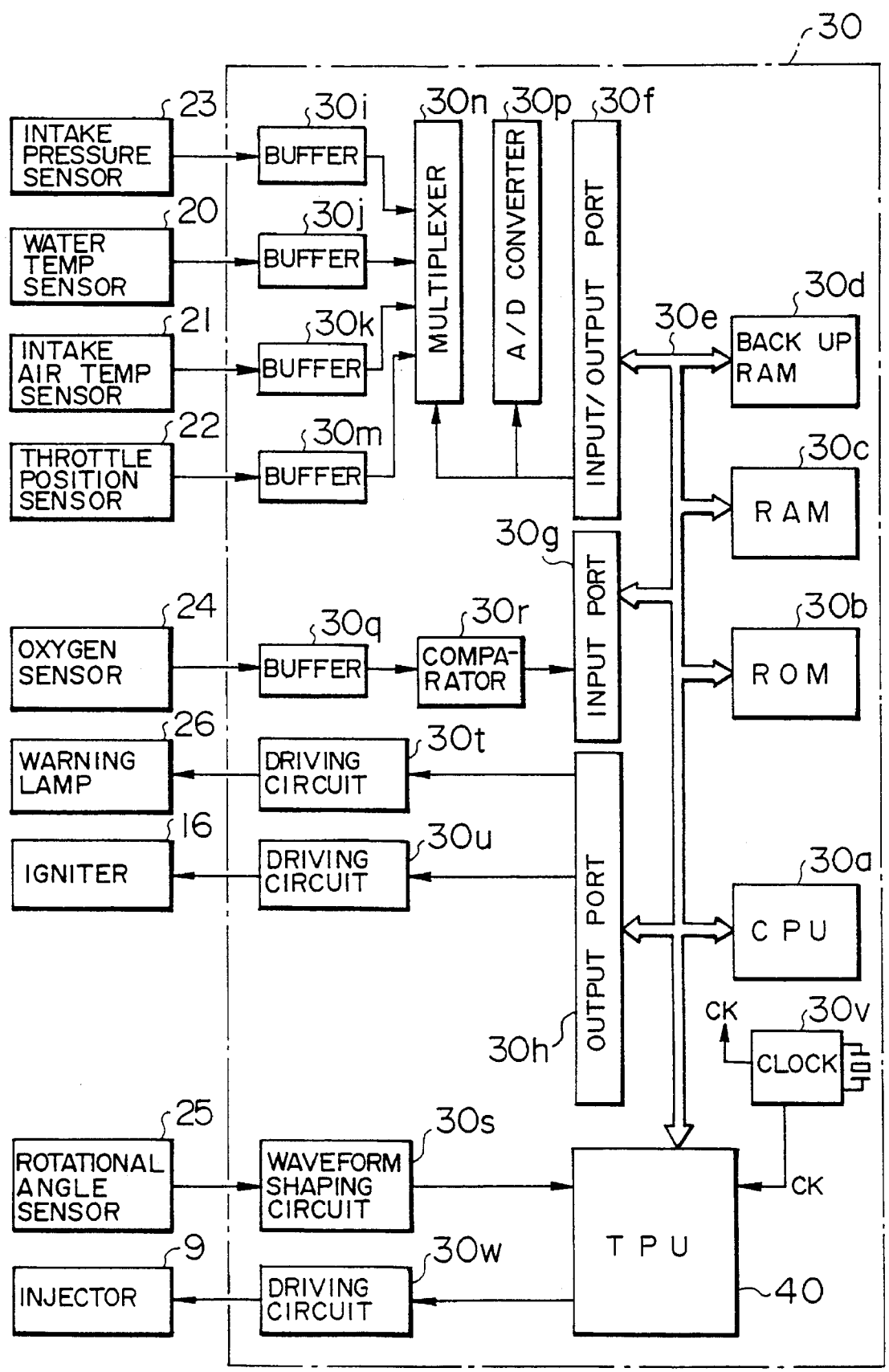
FIG. 2 is an electric system configuration diagram of an ECU shown in FIG. 1.
Figure 3:
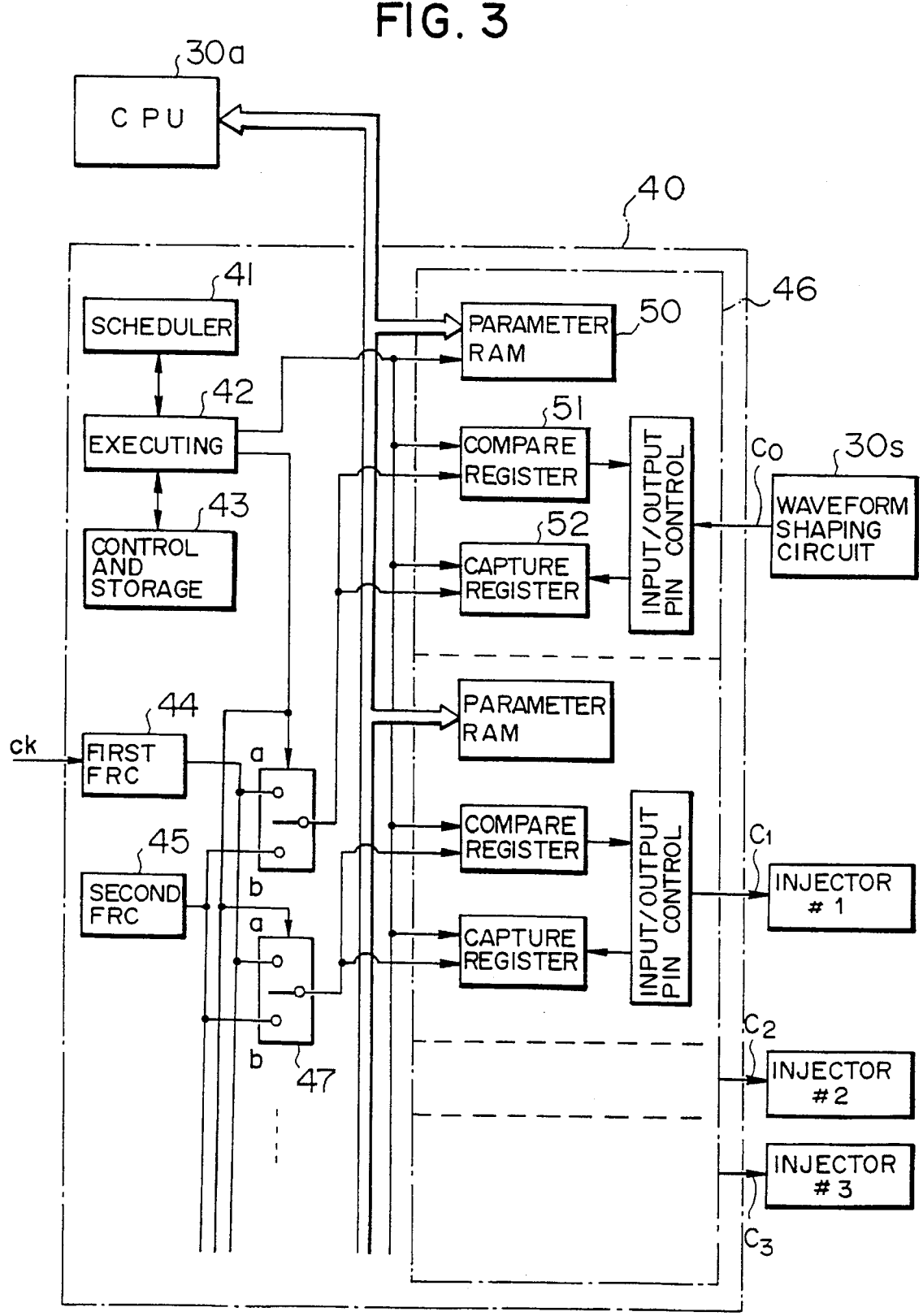
FIG. 3 is an electric system configuration diagram of a TPU shown in FIG. 2.

FIG. 3 shows the internal configuration of the TPU 40 shown in FIG. 2. In FIG. 3, the TPU 40 is constituted by a scheduler 41, an executing portion 42, a control and storage portion 43, a first free run counter (hereinafter referred to as first FRC) 44, a second free run counter (hereinafter referred to as second FRC) 45 and a timer channel portion 46.

The scheduler 41 instructs the executing portion 42 to execute processes such as calculations and data setting in accordance with priority given to each of the channels of the timer channel portion 46. The executing portion 42 executes calculation processes of the specified channel in accordance with a program stored in the Control and storage portion 43. The first FRC 44 is incremented by clock signals CK from the clock circuit 30v. The second FRC 45 counts up in response to the input of rotational angle signals CO input to the timer channel portion 46. This count-up process is executed by the executing portion 42.

Each timer channel 46 is constituted by a parameter RAM 50, compare register 51, capture register 52 and input/output pin control portion 53. Each of these components are provided in a quantity equal to the number of input/output pins of the TPU 40. In this embodiment, since the total number of the input/output pins is 16, 16 parameter RAMs etc. are provided.

Further, a part constituted by a parameter RAM 50, compare register 51, capture register 52 and input/output pin 53 is referred to as a channel in this embodiment. Since the total number of the input/output pins is 16, as mentioned above, there are provided 16 channels in total, i.e., channels 0 through 15.

Rotational angle signals are input to the channel 0 through the waveform shaping circuit 30s, and signals for driving the injector are input to the channels 1 through 4. Various signals for controlling the engine or vehicle, such as the output of a vehicle speed sensor and an ISC valve output, are input to the channel 5 and others, which will not be described because it is not directly related to the present invention.

The parameter RAM 50 is constituted by a dual port RAM which can be accessed by both of the CPU 30a and the executing portion 42 and performs data transfer between the CPU 30a and the TPU 40.

The compare register 51 compares the contents thereof and the contents of the first FRC 44 or second FRC 45 and outputs a signal to an input/output pin control so that a signal at a high or low level is output when the contents of the compare register 51 are greater than or equal to the contents of the first FRC 44 or second FRC 45. Switching for determining whether to output the high level signal or low level signal is set by the executing portion 42.

The capture register 52 detects a rising edge or falling edge of a signal (a rotational angle signal or the like) input to the input/output pin control 53 and maintains the contents of the first FRC 44 at this time. As previously described, the input/output pin control 53 causes a desired signal set by the executing portion 42 to be output when the content of the compare register 51 agrees with the content of the first FRC 44 or second FRC 45 and inputs an external signal to the TPU 40.

The TPU 40 is equipped with a switch portion 47 for switching between a state wherein the compare register 51 or the capture register 52 is connected to the first FRC 44 and a state wherein the compare register 51 or the capture register 52 is connected to the second FRC 45. The switch portion 47 is controlled by instructions from the executing portion 42 and is also provided in a quantity equal to the number of the input/output pins of the TPU 40.

Next, operations for controlling fuel injections using the devices as described above will now be described with reference to the accompanying flow charts and the time charts.

Figure 4:
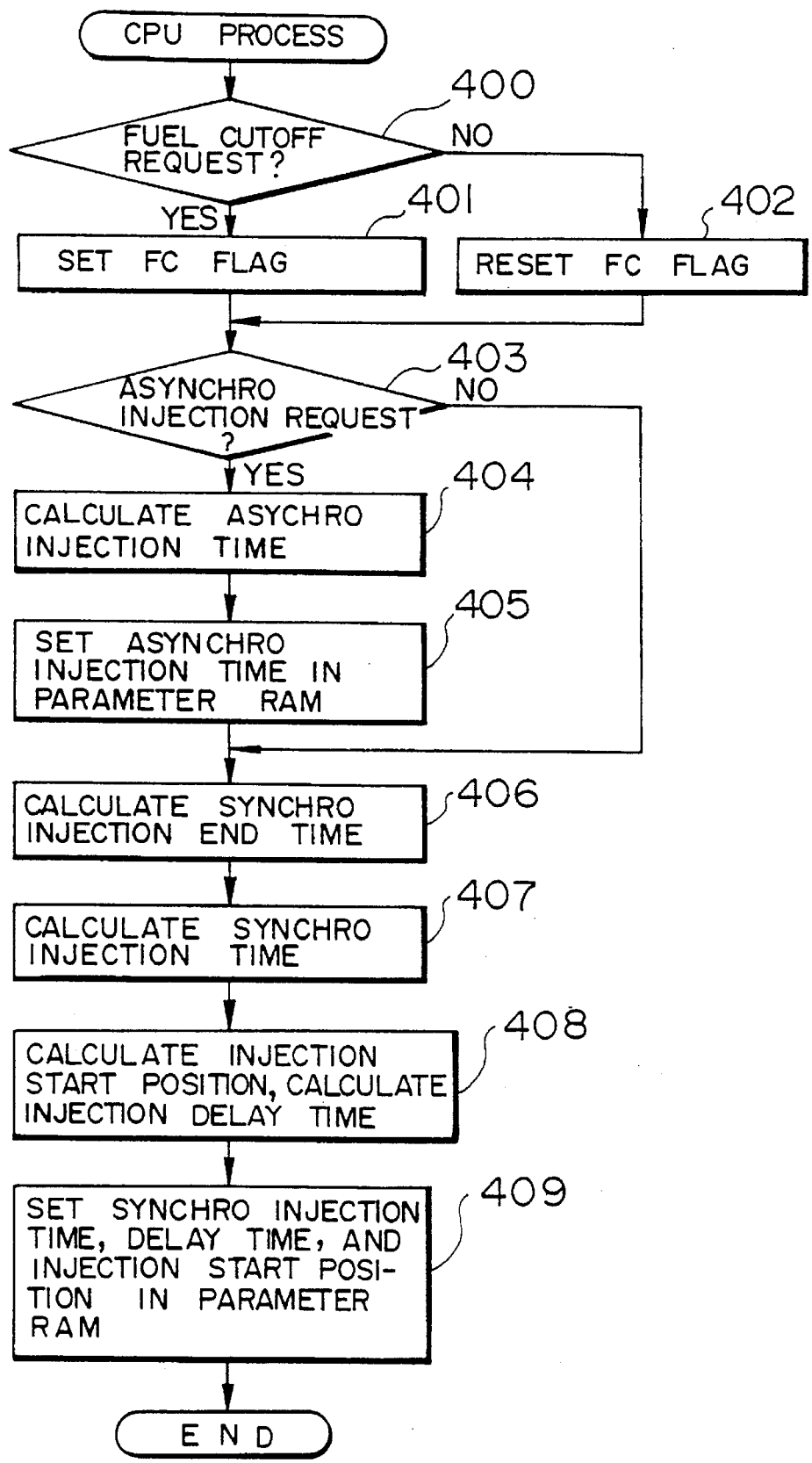
FIG. 4 is a flow chart of a calculation process performed by a CPU.

FIG. 4 is a flow chart showing a process of calculating fuel injection timing, a fuel injection time or duration and the like, which is carried out by the CPU 30a at each predetermined rotational angle.

In FIG. 4, CPU 30a at step 400 checks whether fuel cutoff is requested during vehicle deceleration. The process proceeds to step 401 if there is a fuel cutoff request and to step 402 if there is no fuel cutoff request. An FC flag indicating a fuel cutoff request is set in the parameter RAM 50 for each cylinder at step 401, and the process proceeds to step 403. On the other hand, the FC flag is reset at step 402 based on a determination that there is no fuel cutoff request, and the process proceeds to step 403.

At step 403, it is checked whether there is a request for an asynchronous injection and, if there is a request for an asynchronous injection, the process proceeds to step 404. The determination at step 403 is made, for example, by determining that an asynchronous injection takes place when the quantity of a change in the opening of the throttle is equal to or greater than a predetermined value. At step 404, an asynchronous injection time is calculated based on engine speed and throttle opening, for instance. At step 405, the asynchronous injection time is set in the parameter RAM 50 in the TPU 40 and an asynchronous injection execution flag is set, whereby an asynchronous injection is executed by way of a process in the TPU 40 to be described later.

On the other hand, if it is determined at step 403 that an asynchronous injection is not requested, the process proceeds to step 406 without executing steps 404 and 405.

Figure 5:
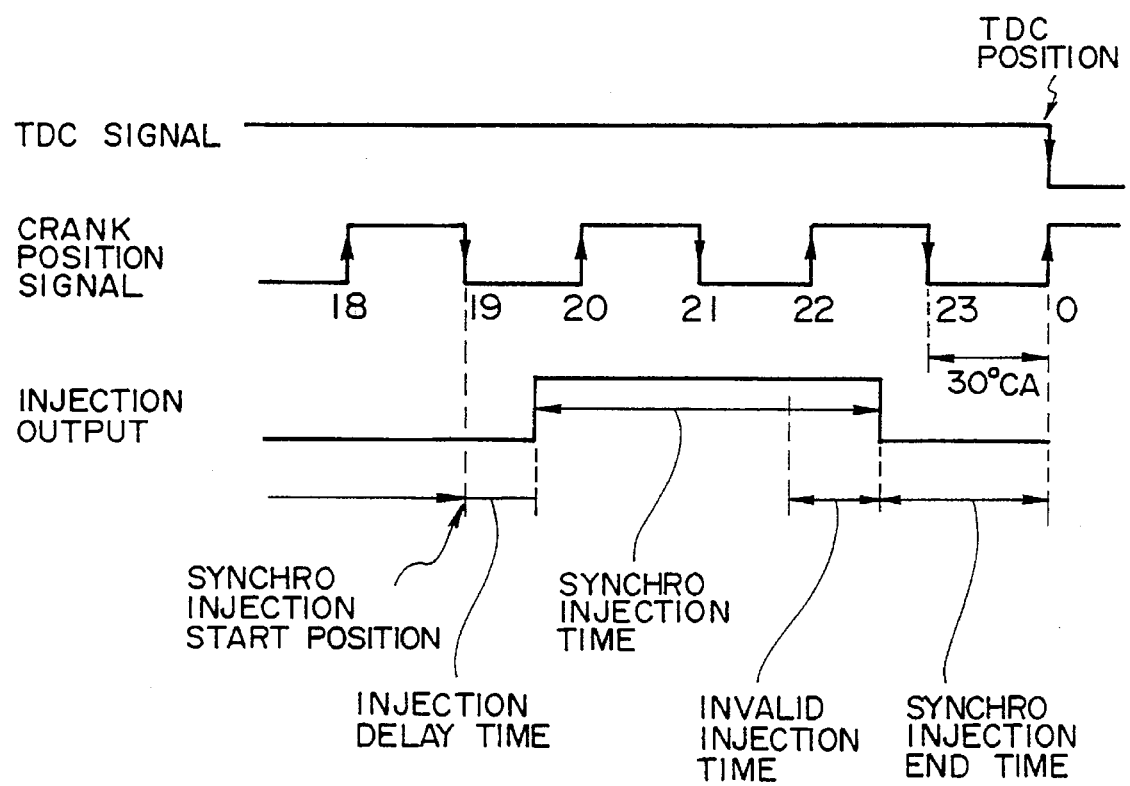
FIG. 5 is a timing chart for explaining the operation of the TPU during the execution of a synchronous injection.

At step 406, an injection end time is calculated. As shown in FIG. 5, the purpose of calculating a synchronous injection end time is to obtain the time which indicates how much the end of a synchronous injection is to precede a TDC (the top dead center of the piston) position and which is determined by engine speed, engine load and the like. At step 407, a synchronous injection time FUT is calculated. A synchronous injection time FUT is calculated from engine speed, water temperature, throttle opening and the like and is a value including an invalid injection time.

At step 408, a synchronous injection starting position NET and an injection delay time FDT are calculated from the synchronous injection end time and the synchronous injection time FUT obtained at steps 406 and 407. The synchronous injection starting position NET is the angular displacement or position at which injection control is started, and the synchronous injection starting position NET is indicated as 19 in FIG. 5.

An injection delay time FDT is a delay time between a synchronous injection starting position NET and the actual generation of an injection output.

At step 409, the synchronous injection time FUT, injection delay time FDT and synchronous injection starting position NET obtained by the above-described calculation processes are set in the parameter RAM 50 of the TPU 40, and this routine is terminated.

Processes performed by the TPU 40 in this embodiment will now be described. First, processes performed by the TPU 40 associated with fuel injection control in the case that there is no request for an asynchronous injection and fuel cutoff will be described.

Figure 6:
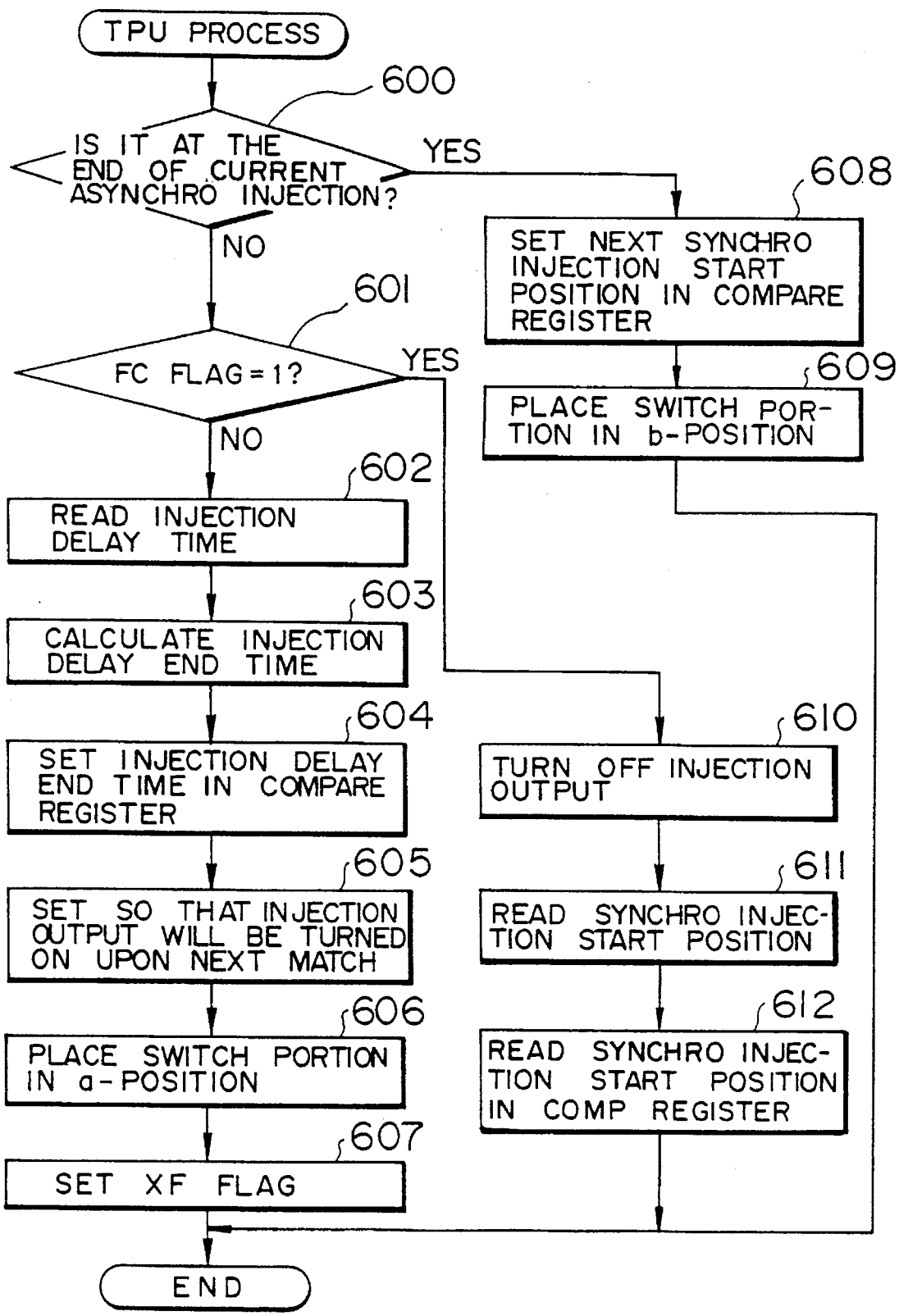
FIG. 6 is a flow chart showing a fuel injection control process performed by the TPU.

FIG. 6 is a flow chart showing a process of calculating the starting time for a synchronous injection so that the synchronous injection is started after the injection delay time FDT from the angular position NET obtained by the above-described calculation process in the CPU 30a. This process is performed in the TPU 40 when the synchronous injection starting position NET stored in the compare register 51 agrees with the actual angular displacement (point (A) in FIG. 10) or each timing at which an asynchronous injection is finished.

In FIG. 6, it is determined at step 600 whether or not the current execution request has been made at the end of a current asynchronous injection. In this case, the process proceeds to step 601 since there is no prior request for an asynchronous injection. At step 601, it is determined whether or not the FC flag indicating the presence of a fuel cutoff request is set. If there is no fuel cutoff request, the process proceeds to step 602.

At step 602, the injection delay time FDT which has been obtained in the CPU 30a and stored in the parameter RAM 50 is read. At step 603, the injection delay time FDT is added to the current time to calculate an injection delay end time (point (B) in FIG. 10). At step 604, the injection delay end time obtained at step 603 is set in the compare register 51 of the TPU 40. Step 605 makes a setting such that a signal at a high level (on output) is generated from the input/output pins when the value in the compare register 51 matches the value in the first FRC 44 for the next time. Specifically, although an arrangement is made so that a signal is output from the compare register 51 on a hardware basis through the input/output pins at timing when the values in the compare register 51 and the first FRC 44 agree, whether the output signal is the high level signal or low level signal can not be determined. Therefore, step 605 sets the input/output pin control so that a high level signal (on output) will be generated.

At step 606, the switch portion 47 is switched to an a-position and, at step 607, an XF flag is set, and this routine is terminated.

Figure 10:
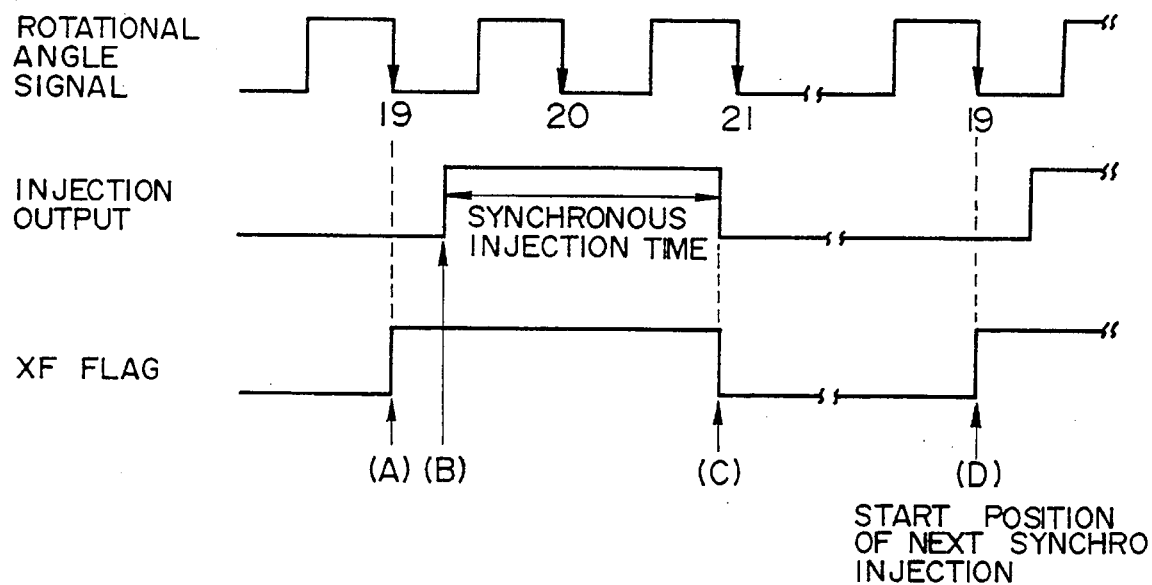
FIG. 10 is a timing chart for explaining the operation of the TPU during the execution of a synchronous injection.

By executing the above-described processes, an injection output signal which goes to the high level from the synchronous injection starting time (point (A) of FIG. 10) to the time (point (B) of FIG. 10) reached after the injection delay time FDT is passed can be obtained to start the fuel injection at appropriate times.

Figure 7:
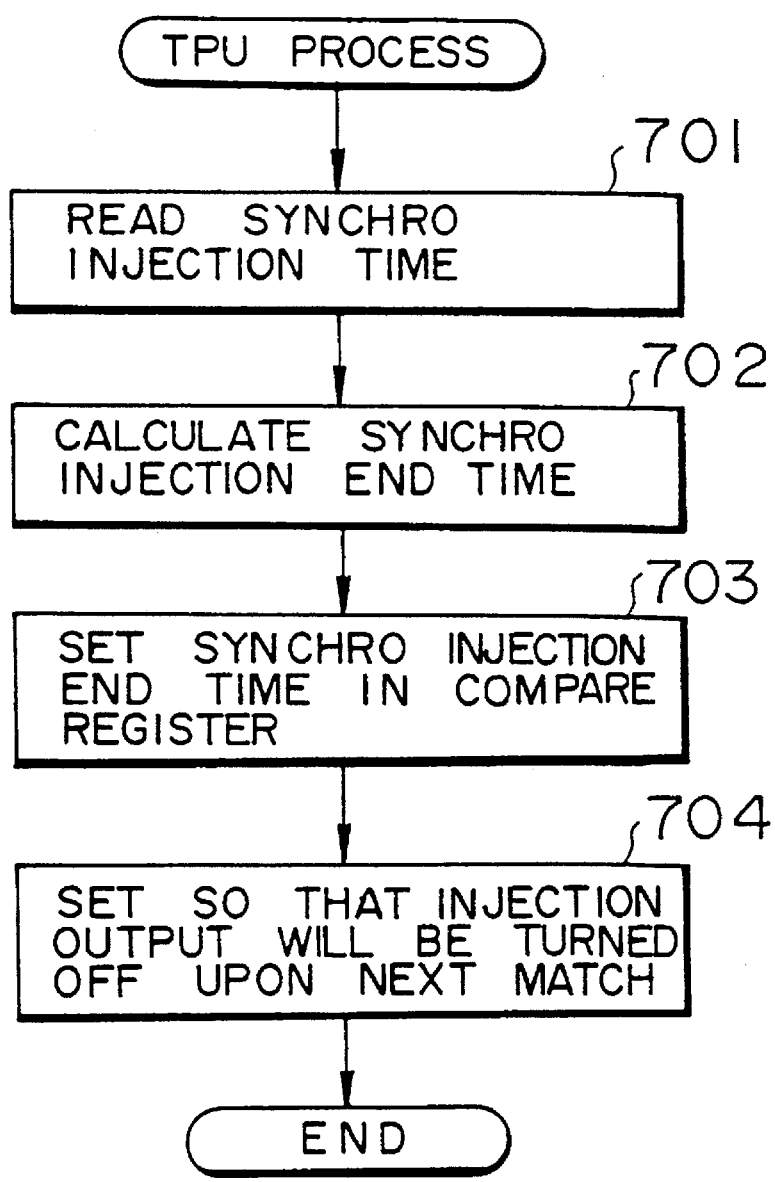
FIG. 7 is a flow chart showing a fuel injection control process performed by the TPU.

FIG. 7 is a flow chart showing a process of setting the synchronous injection end time which is executed by the TPU 40 when a match occurs after the process in FIG. 6 is executed, i.e., when the synchronous injection is started (point (B) of FIG., 10).

In FIG. 7, the synchronous injection time FUT, which has been calculated in the process shown in FIG. 4 and stored in the parameter RAM 50, is read at step 701 and, at step 702, the synchronous injection end time (point (C) of FIG. 10) is calculated. This calculation is used to obtain the synchronous injection end time by adding the synchronous injection time FUT read at step 701 to the value stored in the compare register 51, i.e., the synchronous injection starting time.

At step 703, the synchronous injection end time obtained at step 702 is set in the compare register 51 of the TPU 40. Step 704 makes a setting such that a signal at the low level (on output) is generated from the input/output pins when the values in the compare register 51 and the first FRC 44 match with each other, and this routine is then terminated.

By executing the above-described processes, an injection output signal, which goes to the high level only during the synchronous injection time FUT, can be obtained.

Figure 8:
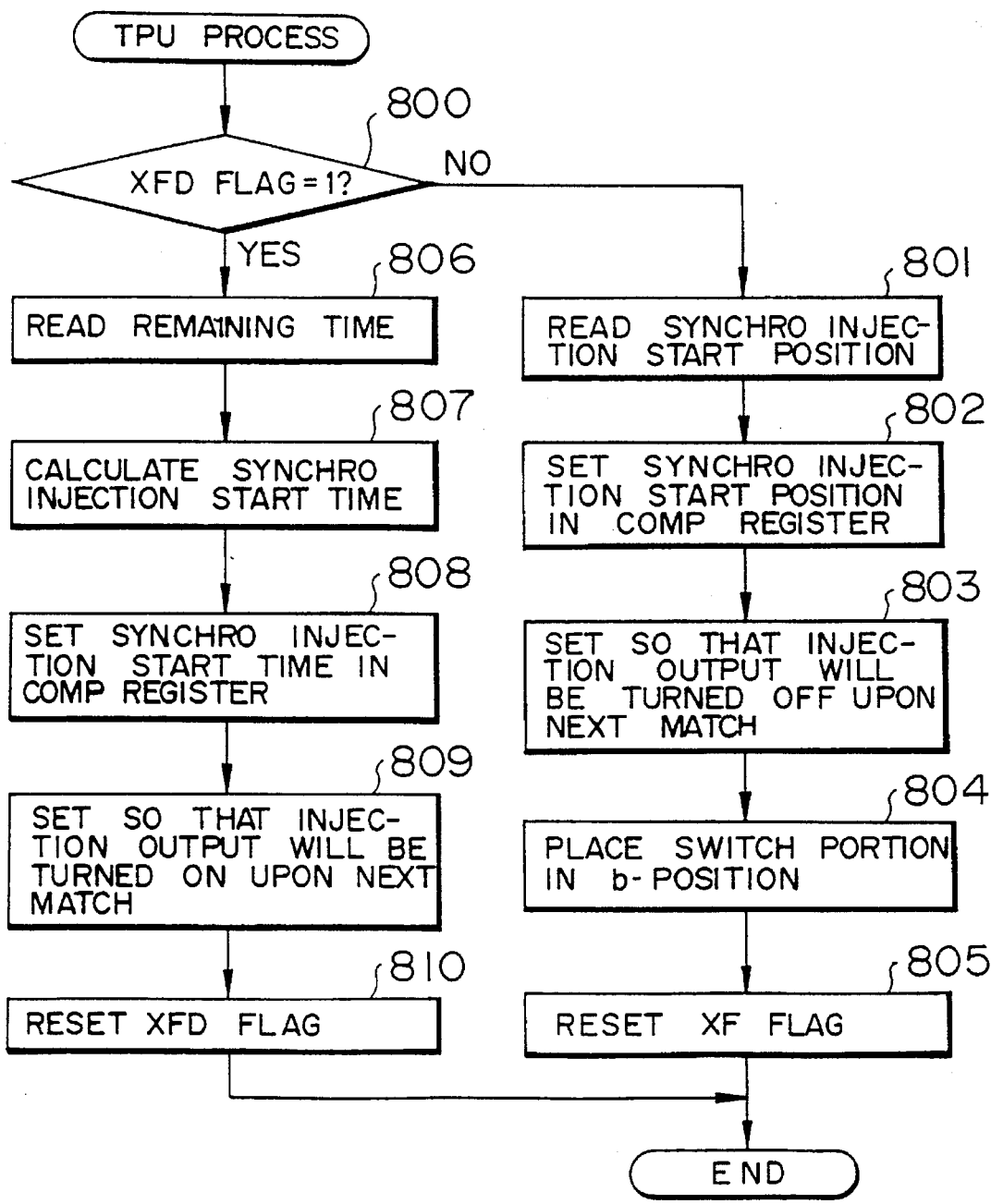
FIG. 8 is a flow chart showing a fuel injection control process performed by the TPU.

FIG. 8 is a flow chart showing a process of setting the next synchronous injection starting position in the same cylinder which is executed by the TPU 40 when a match occurs after the process in FIG. 7 is executed, i.e., when the synchronous injection is finished (point (C) of FIG. 10), or when an asynchronous injection to be described later is finished.

Figure 11:
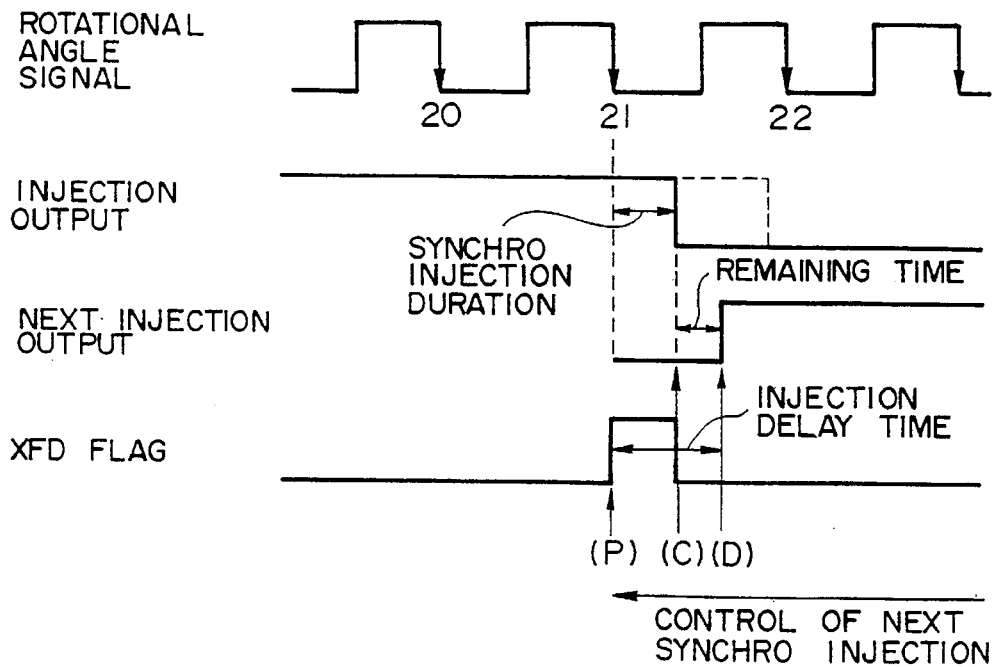
FIG. 11 is a timing chart for explaining the operation of the TPU during the execution of a synchronous injection.

In FIG. 8, it is determined at step 800 whether or not an XFD flag is set. The process proceeds to step 806 if the XFD flag is set and to step 801 if it is not set. For example, the XFD flag is set where the engine speed is high; the synchronous injection time FUT becomes long; and the control for the next synchronous injection is started when the synchronous injection is finished as shown in FIG. 11, where an asynchronous injection is started during an injection delay time and the asynchronous injection is finished during the same time, as shown in (b) of FIG. 14, or where the control for the next synchronous injection is started during an asynchronous injection, .and is set in another routine process to be described later. Such an XFD flag will be described later in detail.

A description will now be given on the case wherein no XFD flag is set. At step 801, a synchronous injection starting position NET, which has been calculated in the process shown in FIG. 4 and stored in the parameter RAM 50, is read and, at step 802, this synchronous injection starting position NET (NET=19 in this case) is set in the compare register 51.

At step 803, a setting is made so that a signal at the low level (off output) is generated from the input/output pins when the value in the compare register 51 agrees with the second FRC 45 for the next time. At step 804, the switch portion 47 is switched to a b-position. At step 805, the XF flag which has been set at step 607 in FIG. 6 at the timing indicated by the position (A) of FIG. 10, is reset, and this routine is terminated.

By executing the processes at steps 800 through 805 as described above, the process shown in FIG. 6 is restarted when a next match occurs, i.e., at the timing indicated by position (D) of FIG. 10 to repeat the synchronous injection executing process shown in FIG. 6 through FIG. 8. It is therefore possible to control the engine by way of the optimum synchronous injection starting positions NET and fuel injection times obtained by the CPU 30a only through calculation processes in the TPU 40.

The processes at steps 806 through 810 will now be described after describing a process of setting an XFD flag with reference to FIG. 9 and FIG. 11.

Figure 9:
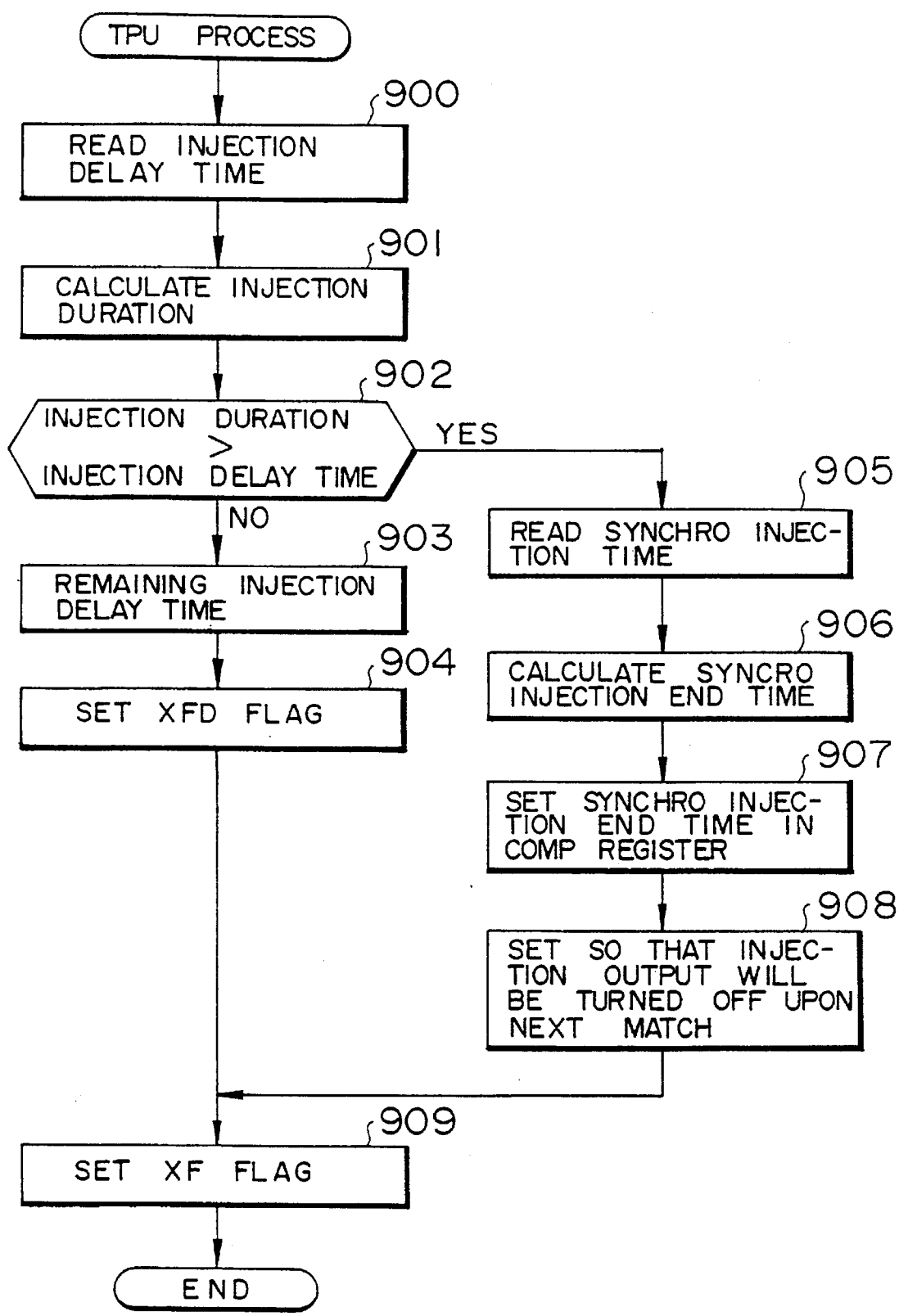
FIG. 9 is a flow chart showing a fuel injection control process performed by the TPU.
Figure 15:
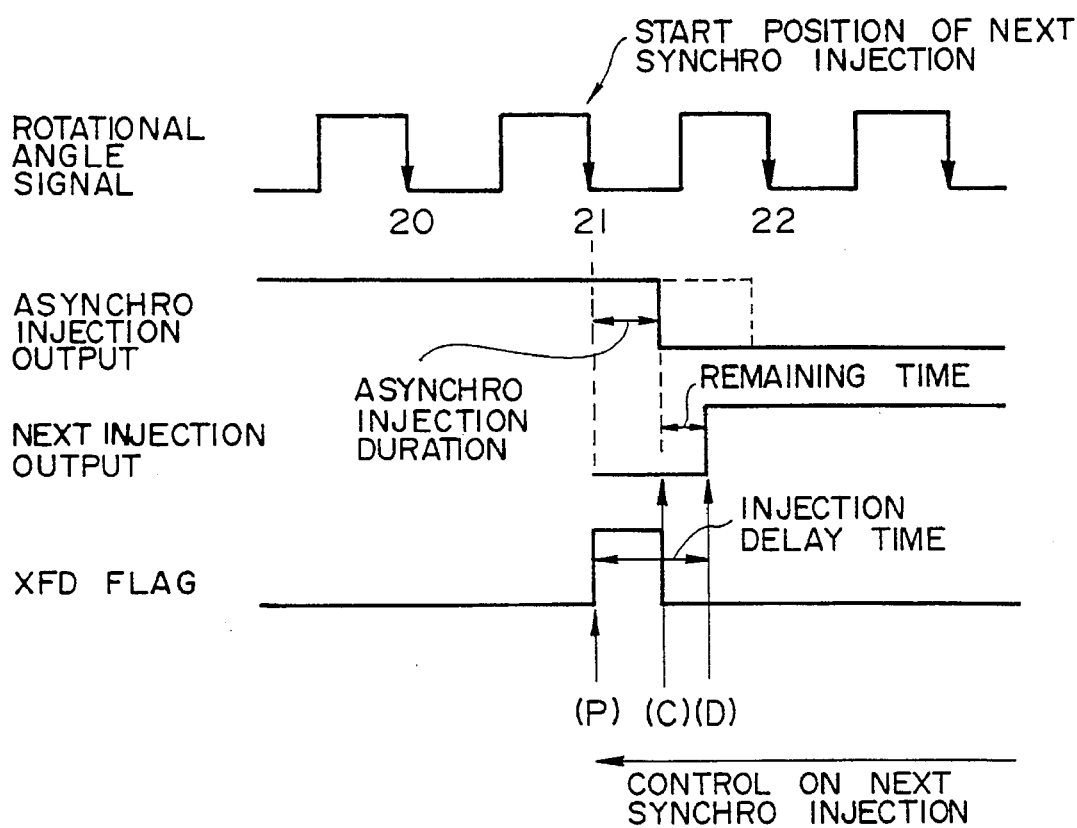
FIG. 15 is a timing chart for explaining the operation of the TPU during a synchronous injection and an asynchronous injection.

The process shown in FIG. 9 is executed when the next synchronous injection starting position is reached (position (P) of FIG. 11) with the XF flag set as shown in FIG. 10, the flag being set from a synchronous injection starting position NET until a synchronous injection end time, or when the next synchronous injection starting position is reached (point (P) of FIG. 15) during an asynchronous injection with the XF flag reset. The process and operation with the XF flag reset will be described later.

In FIG. 9, the injection delay time FDT stored in the parameter RAM 50, more particularly, the injection delay time FDT associated with the next synchronous injection stored in the parameter RAM 50 is read at step 900. At step 901, synchronous injection time or duration is calculated by subtracting the current time from the value in the compare register 51 (the synchronous injection end time is stored at this timing because the process shown in FIG. 8 has not been executed). In other words, the synchronous injection duration represents the period from the next injection starting position (point (P) of FIG. 11)) until the next synchronous injection end time (point (C) of FIG. 11).

At step 902, it is determined whether the synchronous injection duration is longer than the injection delay time FDT for the next synchronous injection. If the synchronous injection duration is shorter than the injection delay time FDT, the process proceeds to step 903 based on a determination that the synchronous injection in progress will be finished during the injection delay time of the next synchronous injection as indicated by the solid line in FIG. 11.

At step 903, a remaining injection delay time (remain or excess time) is calculated, which represents the time interval between the end of the ongoing synchronous injection (point (C) of FIG. 11) and the injection delay end time for the next synchronous injection (point (D) of FIG. 11). This remaining or excess injection delay time can be obtained by subtracting the synchronous injection duration from the injection delay time FDT.

At step 904, an XFD flag indicating that the ongoing synchronous injection will be finished during the injection delay time for the next synchronous injection is set and, at step 909, an XF flag is set and this routine is terminated.

On the other hand, if it is determined at step 904 that the synchronous injection duration is longer than the injection delay time FDT, the process proceeds to step 905 based on a judgement that the ongoing synchronous injection will be finished during the next synchronous injection time as indicated by the broken line in FIG. 11, i.e., the current synchronous injection overlaps with the next synchronous injection. Processes at step 905 and its subsequent steps will be described later.

Accordingly, by executing the above-described processes, it is possible to determine whether the ongoing synchronous injection will be finished during the injection delay time for the next synchronous injection or will be finished during the next synchronous injection time and to set an XFD flag in the former case.

Returning to FIG. 8, a description will now be made on processes in step 806 and its subsequent steps, i.e., processes performed by TPU 40 when the synchronous injection is finished (point (C) of FIG. 11) in the case that it is determined in the process shown in FIG. 9 that the ongoing synchronous injection will be finished during the injection delay time for the next synchronous injection.

At step 806, the remaining injection delay time obtained at step 903 shown in FIG. 9 is read and, at step 807, the next synchronous injection starting time (point (D) of FIG. 11) is calculated by adding this remaining time to the value in the compare register 51.

At step 808, this synchronous starting time is set in the compare register 51 and, at step 809, a setting is made so that a signal at the high level (on output) will be generated from the input/output pins when the next value in the compare register 51 matches with the value in the first FRC 44. At step 810, the XFD flag is reset and the process in this routine is terminated.

The reason for varying the value set in the compare register 51 depending on the result of the determination at step 800 shown in FIG. 8 will now be described with reference to FIG. 10 and FIG. 11.

Specifically, if the next synchronous injection starting position is set (19 is set in this case) when the synchronous injection in progress will be finished during the injection delay time for the next synchronous injection, since the timing at which the value in the compare register 51 matches with the second FRC 45 has already been passed as shown in FIG. 11, the calculation process shown in FIG. 6 can not be performed and, therefore, the synchronous injection can not be started at the timing (point (D) of FIG. 11). Further, if the ongoing synchronous injection will be finished during the injection delay time for the next synchronous injection, there will be a delay in the timing at which the next synchronous injection will be started even if a setting is made so that the injection will be started at the falling edge of the next rotational angle pulse (the timing indicated by 22 in this case).

In this embodiment however the synchronous injection starting time is set in the compare resister 51 in setting the synchronous injection starting position when the synchronous injection is finished (FIG. 10(C)) if it will be finished during an injection delay time. Therefore, it is possible to execute the next synchronous injection when the next match occurs. Further, since the synchronous injection starting time is set by obtaining the remaining time between the end of the synchronous injection (FIG. 11(C)) and the beginning of the next synchronous injection time (FIG. 11(D)) through the process shown in FIG. 9, the next synchronous injection can be executed at the optimum injection timing calculated by the CPU 30a.

Next, a description will be made on the processes at steps 905 through 909, i.e., processes performed when an ongoing synchronous injection will be finished during the next synchronous injection time. (Processes performed when an ongoing asynchronous injection will be finished during the next synchronous injection will be described later.)

At step 905, the next synchronous injection time FUT is read and, at step 906, a synchronous injection end time is calculated using this synchronous injection time FUT. Specifically, the synchronous injection end time is obtained by adding the injection delay time FDT and the synchronous injection time FUT to the value in the compare register 51 (the previous synchronous injection end time).

At step 907, this synchronous injection end time is set in the compare register 51 and, at step 908, a setting is made so that the low level signal (off signal) will be generated from the input/output pins when the next value in the compare register 51 matches with the value in the first FRC 44. At step 909, the XF flag is set and this routine is terminated.

Specifically, in conventional approaches, control can be performed only such that an injection output is brought to a high level for a predetermined synchronous injection time after a predetermined injection delay time when certain angular displacement is reached, and nothing is considered about points such as overlapping synchronous injections as described above. As a result, when two synchronous injections overlap with each other, the next synchronous injection will not be performed.

On the contrary, in the present embodiment, by performing the processes at steps 905 through 908, a synchronous injection in progress is caused to continue in the case of overlapping synchronous injections. This makes it possible to solve problems such as nonperformance of the next synchronous injection and to supply fuel to the engine accurately as required.

A description will now be made on processes performed by the TPU 40 when there is a fuel cutoff request. A fuel cutoff request is determined by the processes at steps 400 through 402 shown in FIG. 4 and, as previously described, the FC flag is set in the parameter RAM 50 if there is the fuel cutoff request. In the process shown in FIG. 6, which is executed when the synchronous injection starting position NET matches with the actual angular displacement, the determination at step 601 is YES and the process proceeds to step 610 to execute a fuel cutoff process as described below.

At step 610, a setting is made on the input/output pin control 53 so that the injection output is turned off when the next match occurs and, at step 611, the next synchronous injection starting position NET is read. At step 612, the next synchronous injection starting position NET is set in the compare register 51, and this routine is terminated.

As a result, the timing at which the next match occurs becomes the next synchronous injection starting position NET and, therefore, fuel cutoff can be performed with the process shown in FIG. 7 skipped.

According to the conventional approaches, in order to perform fuel cutoff, it has been necessary to bring the injection output to the low level outside the TPU or to stop the calculation process of the TPU, which has resulted in an excessively large configuration. Further, the timing for recovery from fuel cutoff must be controlled by the CPU itself, which has added to the calculation processes of the CPU and necessitated providing the CPU with a timer.

On the contrary, according to the present embodiment, the TPU 40 checks the FC flag, and fuel cutoff can be performed when the FC flag is set by only setting the next synchronous injection starting position NET. Further, since the next synchronous injection starting position NET is set, the timing for recovery from the fuel cutoff can be set solely by the TPU 40.

A description will now be made on the process performed by the TPU 40 when there is a request for an asynchronous injection which is one of the most important features of the present invention. An asynchronous injection request is determined by the processes at steps 403 through 405 shown in FIG. 5, and an asynchronous injection execution flag and an asynchronous injection time AFT are stored in the parameter RAM 50. Further, when there is an asynchronous injection request, an asynchronous injection must be performed immediately.

Figure 12:
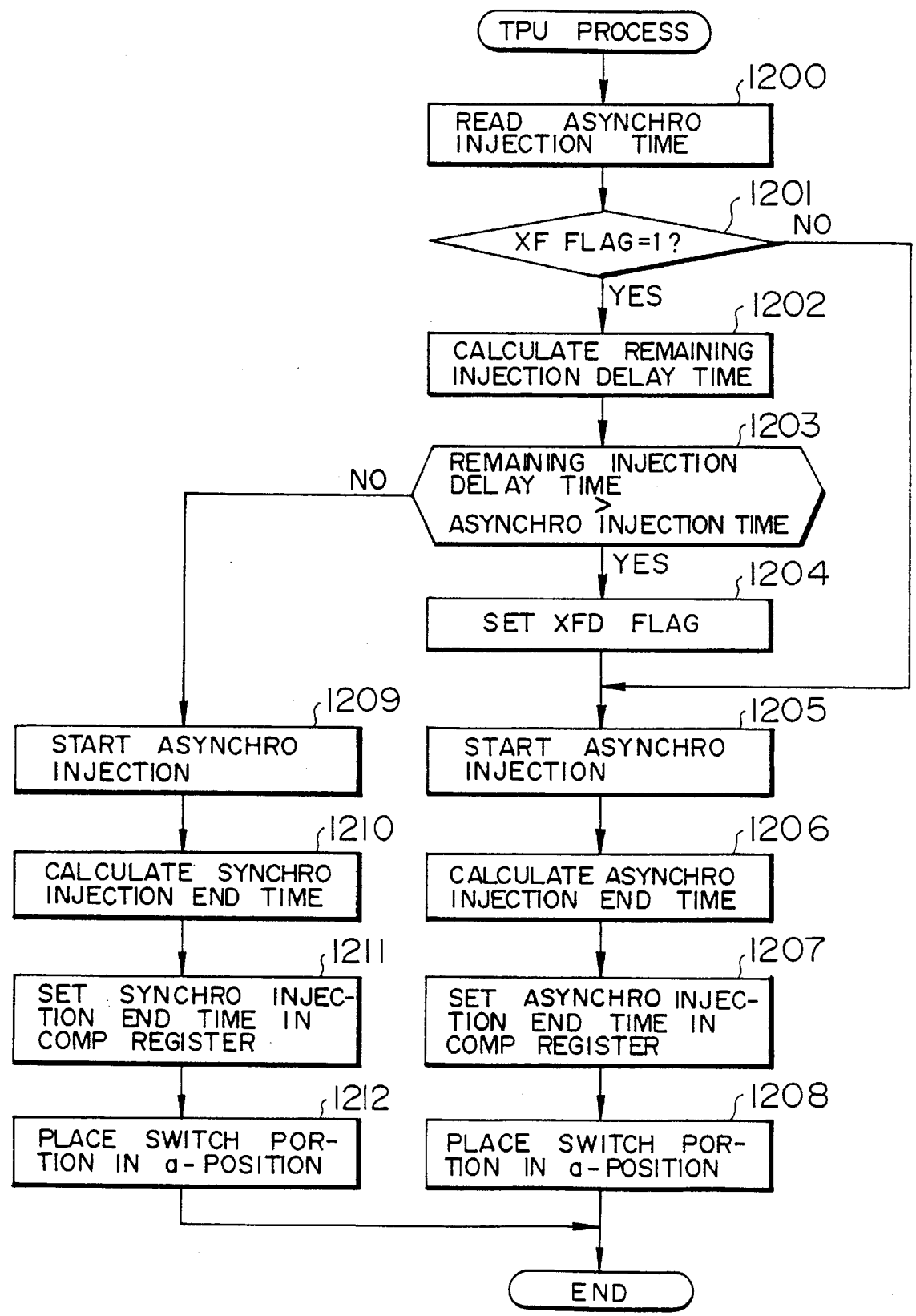
FIG. 12 is a flow chart showing a fuel injection control process performed by the TPU.
Figure 13:
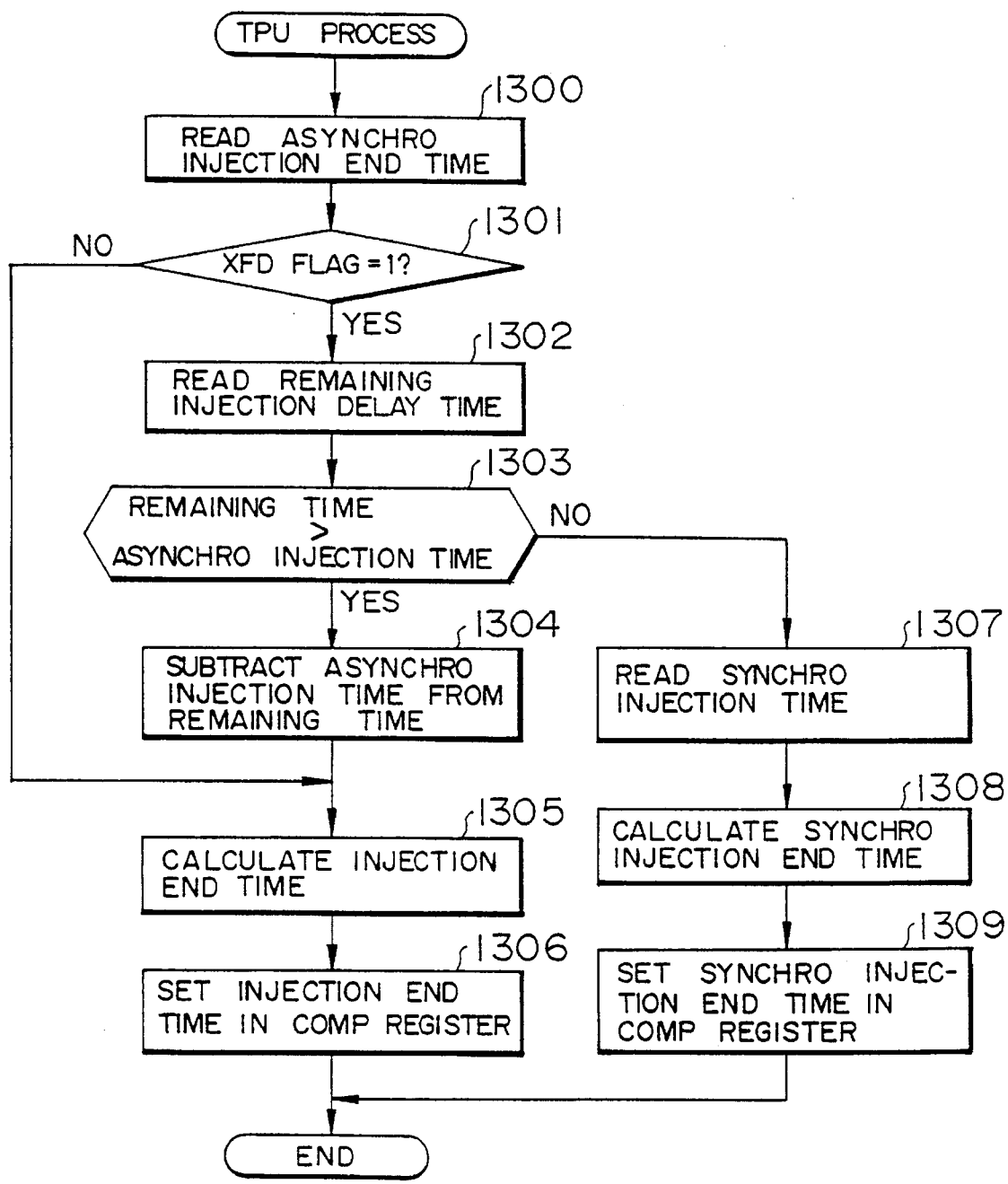
FIG. 13 is a flow chart showing a fuel injection control process performed by the TPU.

FIG. 12 is a flow chart showing the process performed in the case that there is an asynchronous injection request when neither a synchronous nor asynchronous injection is being performed (the injection output is off). FIG. 13 is a flow chart showing the process performed in the case that there is an asynchronous injection request when a synchronous or asynchronous injection is being performed (the injection output is on).

The process performed in the case that there is an asynchronous injection request when the injection output is off will be described with reference to FIG. 12 and FIG. 14.

In FIG. 12, the asynchronous injection time AFT stored in the parameter RAM 50 is read at step 1200. It is determined at step 1201 whether an XF flag is set or not. In other words, although the injection output is at the low level at this time, it is determined whether there has been an asynchronous injection request during the injection delay for the current synchronous injection. The process proceeds to step 1202 if there has been an asynchronous injection request during the injection delay as shown in (b) and (c) of FIG. 14.

Figure 14:
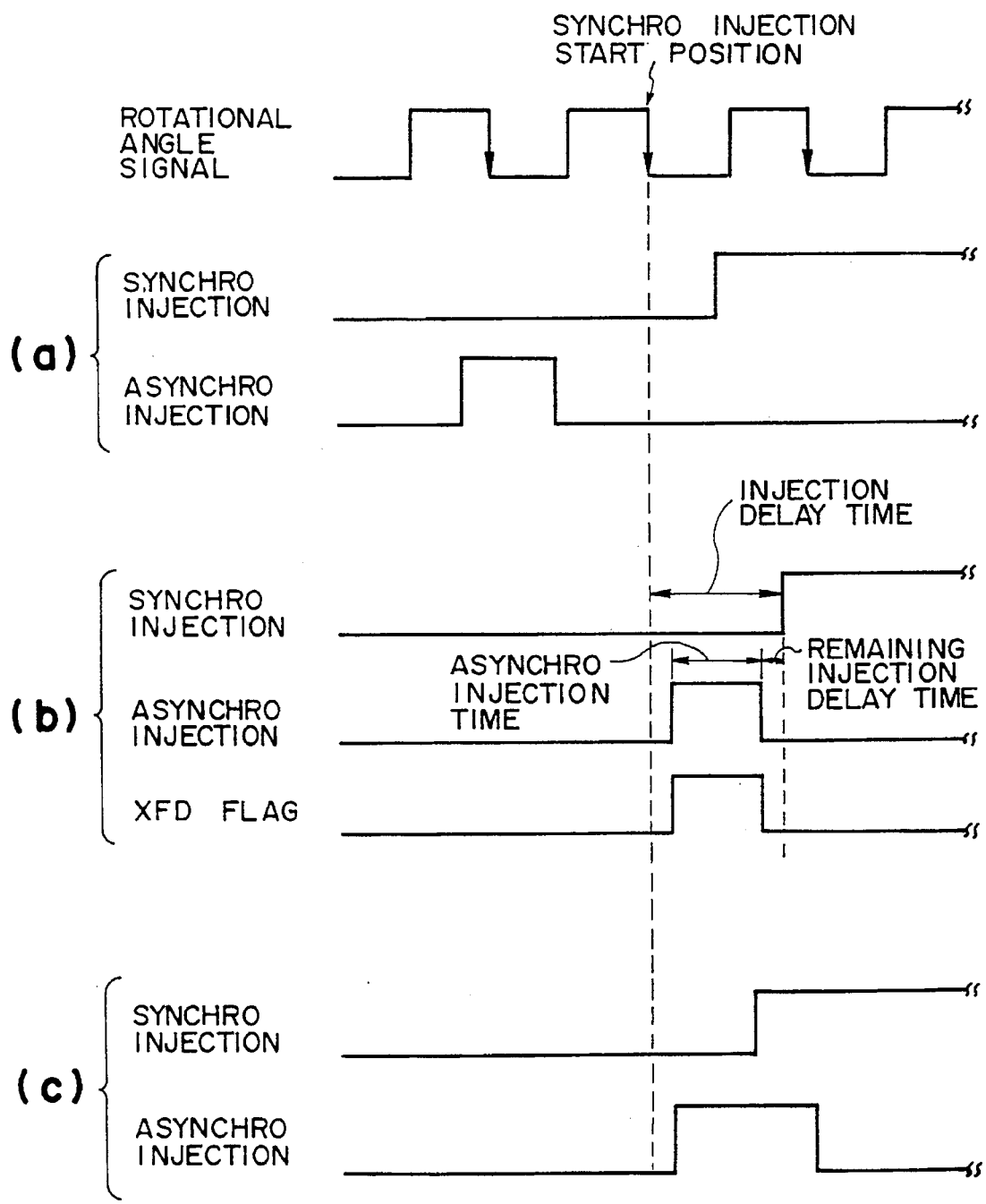
FIG. 14 is a timing chart showing signal conditions (a) through (c) for explaining the operation of the TPU during a synchronous injection and an asynchronous injection.

On the other hand, if there is no asynchronous injection request during the injection delay as in (a) of FIG. 14, the process skips steps 1202 through 1204 to proceed to step 1205.

At step 1205, an asynchronous injection is started by bringing the injection output to the high level and, at step 1206, the time when the asynchronous injection will be finished, is calculated. Specifically, the time at which the asynchronous injection will be finished is obtained by adding the asynchronous injection duration read at step 1200 to the current time.

At step 1207, the asynchronous injection end time is set in the compare register 51 and, at step 1208, the switch portion is switched to the a-position to terminate this routine.

When the asynchronous injection is finished, the process shown in FIG. 6 is performed. Since, this is a process at the end of an asynchronous injection, the determination at step 600 in FIG. 6 is YES and the process proceeds to step 608. At step 608, the synchronous injection starting position NET stored in the parameter RAM 50 is read and set in the compare register 51 and, at step 609, the switch portion is switched to the b-position to terminate this routine. As a result, the value in the compare register 51 and the value in the second FRC 45 will match with each other at the execution timing for the next synchronous injection, and the synchronous injection execution process shown in FIG. 6 through FIG. 9 will be repeated.

Thus, in the present embodiment, fuel injection can be started even at a time which is asynchronous with the rotational angle signal in response to the asynchronous injection request from the CPU 30a, and the asynchronous injection can be performed for the optimum injection time calculated by the CPU 30a.

On the other hand, if the determination at step 1201 is YES and the process proceeds to step 1202, the remaining injection delay time is obtained at step 1202 by subtracting the current time from the value in the compare register 51 (the delay injection end time is stored in this case). This remaining injection delay time indicates how long the injection delay will continue from the current time and is the time indicated by the remaining injection delay time as shown in (b) of FIG. 14. At step 1203, it is determined whether this remaining injection delay time is longer than the asynchronous injection execution time or not and, if yes, it is determined that the asynchronous injection will be finished before a synchronous injection will be started (the injection output will go to the high level) as shown in (b) of FIG. 14 and the process proceeds to step 1204.

After setting the XFD flag at step 1204, the process proceeds to step 1205 at which the above-described process is performed to terminate this routine. When the asynchronous injection is finished, the process shown in FIG. 8 is performed wherein the determination at step 800 is YES and the processes at steps 806 through 810 are performed. Thus, when the asynchronous injection is finished during the injection delay for the synchronous injection, the next synchronous injection can be reliably performed because the synchronous injection starting time is set in the compare register 51 just as in the case that the synchronous injection is finished during the injection delay for the next synchronous injection.

On the other hand, if it is found at step 1203 that the remaining injection delay time is not longer than the asynchronous injection execution time, it is determined that the asynchronous injection overlaps with the synchronous injection as shown in (c) of FIG. 14 and the process proceeds to step 1209.

At step 1209, the injection output is brought to the high level as in step 1205 to start the asynchronous injection and, at step 1210, the synchronous injection end time is calculated. Specifically, the synchronous injection end time is obtained by adding the asynchronous injection time and the synchronous injection time stored in the parameter RAM 50 to the current time.

At step 1211, the synchronous injection end time is stored in the compare register 51 and, at step 1212, the switch portion is switched to the a-position to terminate this routine.

Accordingly, by performing the processes as described above, the CPU 30a can perform the asynchronous injection at the optimum timing by only storing the asynchronous injection time AFT in the TPU 40 without executing the processes in itself.

In addition, according to the present embodiment, if the comparison between the remaining injection delay time and the asynchronous injection time AFT results in a determination that the asynchronous injection overlaps with the synchronous injection, the time at which the synchronous injection is to be finished is stored in the compare register 51. This prevents problems such as nonperformance of the synchronous injection after the execution of the asynchronous injection. Further, the synchronous injection end time is obtained by adding the asynchronous injection time AFT and the synchronous injection time FUT in this case. Therefore, even if the asynchronous and synchronous injections overlap, the synchronous injection end time is delayed accordingly, thereby preventing the quantity of fuel supplied to the engine from being reduced.

Next, a description will be made with reference to FIG. 15 on the process shown in FIG. 9 performed in the case that the starting position for the next synchronous injection is reached during the execution of an asynchronous injection.

While the synchronous injection duration was calculated at step 901 in the process previously described, asynchronous injection duration will be obtained this time since an asynchronous injection is being executed. In this case, there is no change in the calculation processes actually performed in the TPU themselves.

Figure 16:
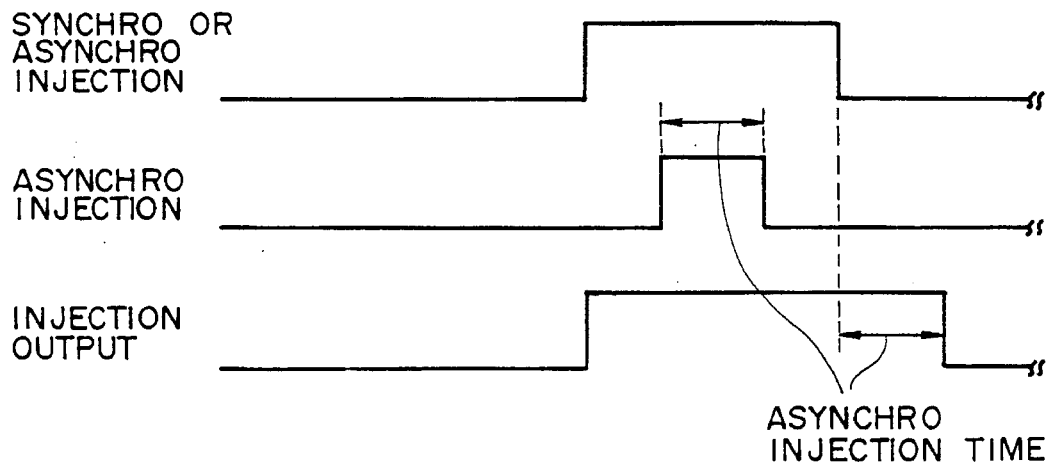
FIG. 16 is a timing chart for explaining the operation of the TPU during a synchronous injection and an asynchronous injection.
Figure 17:
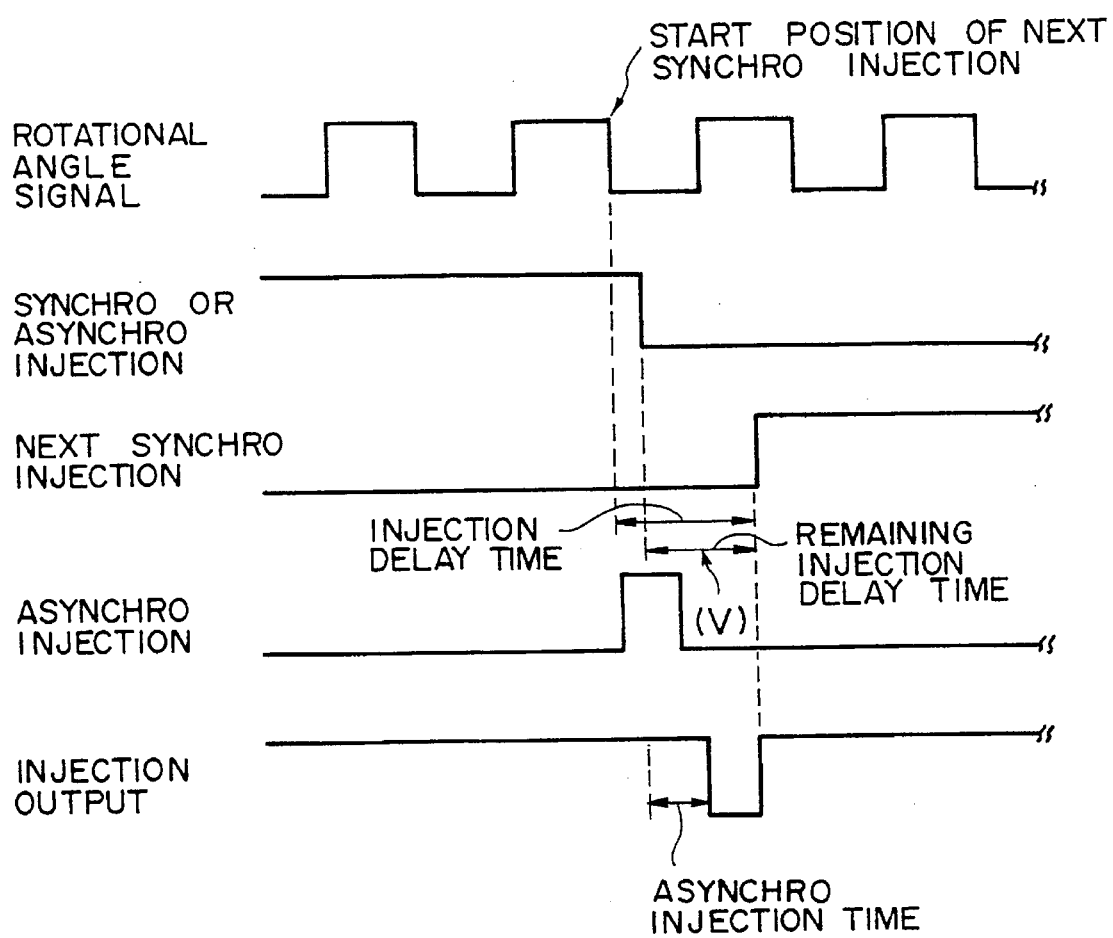
FIG. 17 is a timing chart for explaining the operation of the TPU during a synchronous injection and an asynchronous injection.

A description will now be made on the process performed in the case that there is the asynchronous injection request when the injection output is on with reference to FIG. 16 through FIG. 18.

In FIG. 13, the asynchronous injection time AFT stored in the parameter RAM 50 is read at step 1300. At step 1301, it is determined whether an XFD flag is set or not, or whether the injection in progress will be finished during the next synchronous injection delay time or not. The process proceeds to step 1302 if the XFD flag is set and to step 1305 if it is not set.

At step 1305, an injection end time is calculated by adding the asynchronous injection time AFT to the value currently stored in the compare register 51 (the time at which the injection in progress will be finished is stored). At step 1306, the injection end time is set in the compare register 51, and this routine is terminated. As a result, the time for the injection in progress is extended by the asynchronous injection time AFT as shown in FIG. 15, and the quantity of fuel supplied to the engine is thereby increased.

On the other hand, if the XFD flag is set and the injection in progress will be finished during the next synchronous injection delay time, the remaining injection delay time is read at step 1302. This remaining injection delay time is calculated at step 903 shown in FIG. 9 if the next synchronous injection starting position is reached during the execution of the injection. It is calculated and stored at step 1202 shown in FIG. 12 if the asynchronous injection occurs during the injection delay.

It is determined at step 1303 whether this remaining injection delay time is longer than the asynchronous injection time AFT or not. If yes, it is determined that the injection in progress will be finished during the injection delay time even if it is extended by the asynchronous injection time AFT as shown in FIG. 17, and the process proceeds to step 1304.

At step 1304, the currently set remaining injection delay time is changed by subtracting the asynchronous injection time AFT from the remaining injection delay time, and the process proceeds to step 1305 at which the previously described process is performed.

Figure 18:
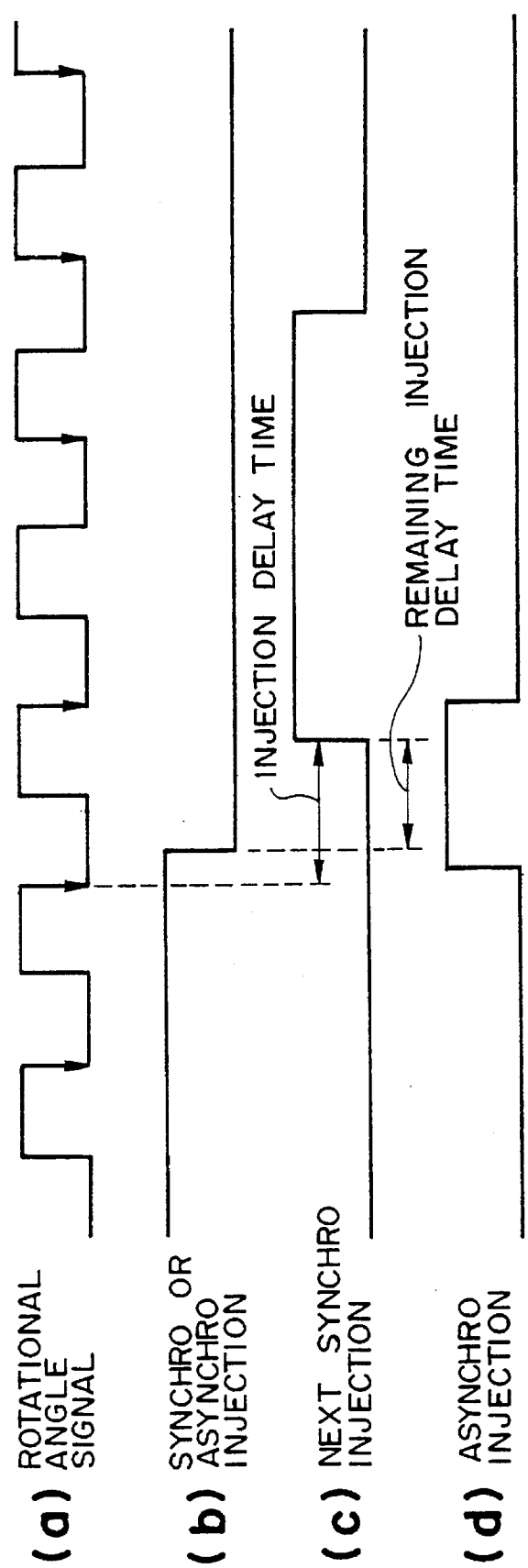
FIG. 18 is a timing chart showing signal conditions (a) through (d) for explaining the operation of the TPU during a synchronous injection and an asynchronous injection.
Figure 19:
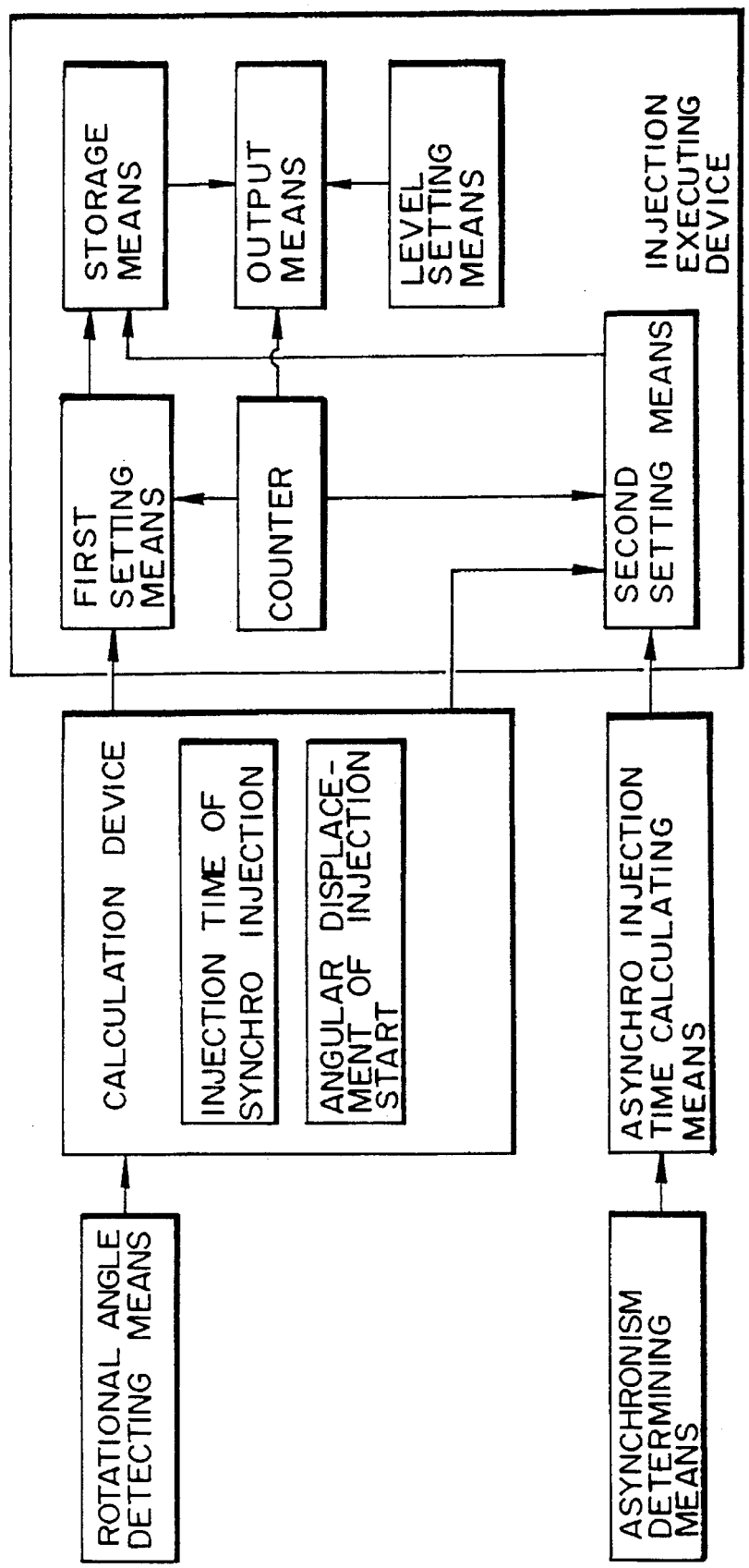
FIG. 19 is a block diagram of the major components of the present invention.

On the other hand, if the determination at step 1303 is NO, i.e., if it is determined that the injection in progress will not be finished during the next synchronous injection time as shown in FIG. 18 as a result of the extension of the same by the asynchronous injection time AFT, the process proceeds to step 1307. At step 1307, the next synchronous injection time FUT stored in the parameter RAM 50 is read.

At step 1308, an injection end time is calculated. Specifically, it is obtained by adding the synchronous injection time FUT read at step 1307 and the asynchronous injection time AFT read at step 1300 to the value in the compare register 51 (the time at which the previous injection was finished). At step 1309, this injection end time is set in the compare register 51, and this routine is terminated.

In the device according to the present invention, therefore, it is possible to perform not only fuel injection control in synchronism with rotational angle signals but also control over fuel cutoff, asynchronous injections and the like by way of only calculations in the TPU 40 without the need for calculation processes performed by the CPU 30a. In addition, optimum injection control can be performed without the problem that the next synchronous injection will not be executed even if there is an overlap between synchronous injections or between the synchronous injection and the asynchronous injection.

In the foregoing present embodiment, the rotational angle sensor 25 corresponds to and serves as the rotation angle detecting means; steps 407 and 408 correspond to and serve as the calculation device; the compare register 51 corresponds to and serves as the storage means; the first FRC 44 corresponds to and serves as the counter: steps 604, 608, 612, 702, 802, 808 and 907 correspond to and serve as the first setting means; step 403 corresponds to and serves as the asynchronism determining means; step 404 corresponds to and serves as the asynchronous injection time calculating means; steps 1207, 1211, 1306 and 1309 correspond to and serve as the second setting means; steps 605, 610, 703, 803, 809 and 908 correspond to and serve as the output means; the executing portion 42 corresponds to and serves as the level setting means; and the TPU 40 corresponds to and serves as the injection executing device.

As described above, with the fuel injection control system according to the present invention, fuel control can be performed even on injection requests which are asynchronous with rotation angle signals such as for the asynchronous injection without using calculation processes performed by the CPU. Thus, the system can be provided, which has high practicability and less computational load.

The present invention should not be limited to the above-described presently preferred embodiment but may be modified in various ways without departing from the spirit of the invention.

What is claimed is:

1. A fuel injection control system comprising:

a central processing unit for calculating fuel injection date including a fuel injection start position and a fuel injection time depending on operating conditions of an internal combustion engine;

storage means for storing said fuel injection data calculated by said central processing unit; and timer means for performing fuel injection control based on said fuel injection data without interrupting processes performed by said central processing unit so that a fuel injection is started and finished at timings which are defined by said fuel injection data stored in said storage means;

said central processing unit being adapted to:
determine whether there is a request for an asynchronous injection,
calculate an asynchronous injection time if said asynchronous injection is requested, and
set data in said storage means at a predetermined level and for setting said calculated asynchronous injection time in said storage means;

said timer means detecting said data at said predetermined level stored in said storage means and controlling said fuel injection in accordance with said asynchronous injection time stored in said storage means if said asynchronous injection is requested, wherein said timer means includes:
an executing portion;
a first counter which is counted up at a predetermined time interval;
a second counter which is counted up at a predetermined crank angular interval of said internal combustion engine;
a compare register in which said fuel injection data stored in said storage means through processes performed by said executing portion are set and which compares a value of one of said first and second counter with said fuel injection data; and
output means for outputting an injection signal at one of a high and a low level to execute and cut off a fuel injection when said compare register indicates that said fuel injection data agrees with a value in one of said first and said second counter.

2. A fuel injection control system according to claim 1, wherein said executing portion includes means for determining whether there is a fuel injection in progress if it is determined that said asynchronous injection is requested as a result of detection of said data at said predetermined level stored in said storage means, for bringing said injection signal from said output means to high level when it is determined that there is no fuel injection in progress, for calculating an asynchronous injection end time in accordance with said asynchronous injection time stored in said storage means, and for setting said asynchronous injection end time in said compare register.

3. A fuel injection control system according to claim 1, wherein identification data is provided for identifying an injection delay time between a crank angular position in which said synchronous injection is started and an actual execution of fuel injection, and wherein said executing portion includes means for determining whether there is a fuel injection in progress if it is determined that there is a request for said asynchronous injection as a result of retrieval of said data at said predetermined level stored in said storage means, for bringing said injection signal from said output means to said high level when it is determined that there is no fuel injection in progress, for comparing said asynchronous injection time stored in said storage means when it determines that it is in said injection delay time by detecting said identification data, and for setting a time at which said synchronous injection is to be finished in said compare register when it is determined that said asynchronous injection and said synchronous injection overlap.

4. A fuel injection control system according to claim 1, wherein said calculation executing portion includes:

means for determining whether there is a fuel injection in progress if it is determined that there is a request for said asynchronous injection by detecting said data at said predetermined level stored in said storage means, and for setting, if there is a fuel injection in progress, a value which is a sum of said injection end time of said fuel injection in progress and said asynchronous injection time stored in said storage means in said compare register.

5. A fuel injection control system according to claim 1, wherein a second identification data is provided to indicate that said injection signal from said output means is at said high level and said crank angular position in which the next synchronous injection is to start has been reached; and wherein said executing portion includes means for determining whether there is a fuel injection in progress if it is determined that there is a request for said asynchronous injection as a result of retrieval of said data at said predetermined level stored in said storage means, for determining whether said second identification data have been set if it is determined that there is a fuel injection in progress, for comparing said injection delay time for a next synchronous injection and said asynchronous injection time stored in said storage means if said second identification data have been set, and for setting the time at which said next synchronous injection is to be finished in said compare register if it is determined that said asynchronous injection overlaps with said next synchronous injection.

6. A fuel injection control system comprising:

a central processing unit for calculating fuel injection data including a fuel injection position and a fuel injection time depending on operating conditions of an internal combustion engine;

storage means for storing said fuel injection data;

timer means for performing fuel injection control based on said fuel injection data without interrupting processes performed by said central processing unit so that a fuel injection is started and finished at timings which are defined by said fuel injection data stored in said storage means;

said central processing unit being adapted to:
- determine whether there is a request for an asynchronous injection,
- set first data in said storage means at a predetermined level and to set said asynchronous injection time in said storage means if an asynchronous injection is requested,
- determine whether operation of said internal combustion engine is in a fuel cutoff operation region, and
- set second data at a predetermined level in said storage means if it is determined that said fuel cutoff operation region has been entered;

said timer means including:
- means for executing a fuel injection in accordance with said asynchronous injection time stored in said storage means by detecting said first and second data at the predetermined levels stored in said storage means and for stopping a fuel injection by detecting said second data stored in said storage means, said means for executing a fuel injection in said timer means includes:
- an executing portion;
- a first counter which is counted up at a predetermined time interval;
- a second counter which is counted up at a predetermined crank angular interval of said internal combustion engine;
- a compare register in which said fuel injection data stored in said storage means through processes performed by said executing portion are set and which compares a value in one of said first and said second counter with said fuel injection data; and
- output means for outputting a predetermined injection signal at one of a high and a low level to execute and cut off a fuel injection when said compare register indicates that said fuel injection data agrees with said value in one of said first and second counters.

7. A fuel injection control system according to claim 6, wherein said executing portion includes means for interrupting fuel injection in progress if it is determined that said fuel cutoff operation region has been entered by detecting said second data at the predetermined level stored in said storage means and for setting the crank angular position in which a next synchronous injection is to start in said compare register.

8. A fuel injection control system according to claim 6, wherein said executing portion includes:

first calculation process means which is activated if there is a fuel injection in progress and a crank angular position in which said next synchronous injection is to start is reached for comparing injection duration which is a difference between a time at which said injection in progress will be finished and a current time to an injection delay time for a next synchronous injection, for setting third identification data if said injection duration is shorter than said injection delay time, and for setting a time at which said next synchronous injection will be finished in said compare register if said injection duration is longer than said injection delay time; and second operation process means which is activated if said injection in progress is finished for setting said time at which said next synchronous injection is to start in said compare register.

9. A fuel injection control apparatus for an internal combustion engine having a fuel injector, said apparatus comprising:

a central processing unit for calculating fuel injection data including a fuel injection start position and a fuel injection time;

storage means for storing said fuel injection data; and timer means for driving said fuel injector based on said stored fuel injection data without interrupting calculation operations of said central processing unit, wherein said timer means includes:

an executing portion;

a first counter which counts at a predetermined time interval;

a second counter which counts at a predetermined crank angular interval of said engine;

a compare register in which said fuel injection data stored in said storage means is set through operation of said executing portion and which compares a count value of either one of said first and second counters with said fuel injection data; and output means for producing an output signal to drive and stop said injector when said compare register indicates that said fuel injection data matches said count value.

* * * * *